US009161066B1

(12) United States Patent
Oztaskent et al.

(10) Patent No.: US 9,161,066 B1
(45) Date of Patent: Oct. 13, 2015

(54) METHODS, SYSTEMS, AND MEDIA FOR GENERATING AND PRESENTING SUPPLEMENTAL CONTENT BASED ON CONTEXTUAL INFORMATION

(71) Applicants: Ant Oztaskent, Sutton (GB); Yaroslav Volovich, Cambridge (GB)

(72) Inventors: Ant Oztaskent, Sutton (GB); Yaroslav Volovich, Cambridge (GB)

(73) Assignee: Google Inc., Mountain View, CA (US)

( * ) Notice: Subject to any disclaimer, the term of this patent is extended or adjusted under 35 U.S.C. 154(b) by 21 days.

(21) Appl. No.: 13/826,910

(22) Filed: Mar. 14, 2013

(51) Int. Cl.
*H04H 60/32* (2008.01)
*H04N 21/24* (2011.01)

(52) U.S. Cl.
CPC ..................... *H04N 21/24* (2013.01)

(58) Field of Classification Search
USPC ......................................... 725/14, 18, 19, 40
See application file for complete search history.

(56) References Cited

U.S. PATENT DOCUMENTS

| 8,694,533 | B2 | 4/2014 | Oztaskent et al. | |
| 2002/0147984 | A1* | 10/2002 | Tomsen et al. | 725/109 |
| 2012/0240144 | A1* | 9/2012 | Rose | 725/14 |

OTHER PUBLICATIONS

U.S. Appl. No. 13/594,693, filed Aug. 24, 2012.

* cited by examiner

*Primary Examiner* — Pankaj Kumar
*Assistant Examiner* — Charles N Hicks
(74) *Attorney, Agent, or Firm* — Byrne Poh LLP

(57) ABSTRACT

Methods, systems, and media for generating and presenting supplemental content based on contextual information are provided. In some implementations, a method for presenting content to a user is provided, the method comprising: identifying a program based on first media data; identifying one or more keywords associated with the program; determining a popularity score associated with each of the one or more keywords; obtaining one or more properties associated with a particular keyword of the one or more keywords based on the popularity score associated with each keyword; generating supplemental content for the program based on the one or more properties; receiving a request for supplemental content and second media data from a computing device; and upon determining that the second media data corresponds to the program, causing the generated supplemental content to be presented by the computing device.

21 Claims, 13 Drawing Sheets

METHODS, SYSTEMS, AND MEDIA FOR GENERATING AND PRESENTING SUPPLEMENTAL CONTENT BASED ON CONTEXTUAL INFORMATION

TECHNICAL FIELD

Methods, systems, and media for generating and presenting supplemental content based on contextual information are provided.

BACKGROUND

Many viewers are interested in interacting with the media content that they are viewing. In response, some content providers or other third parties have created applications for mobile devices that provide a viewer with a poll, a quiz, or other content relating to the programming provided by a particular content provider. For example, upon downloading an application corresponding to particular piece of media content (e.g., a particular television program), a viewer can use a mobile device to launch the content specific application which provides a quiz or other related content. This related content is often generated by a person that develops content for the content specific application relating to the particular content provided by the content provider.

However, generating content using these approaches can be costly and time consuming. In addition, some content does not have any associated supplemental content. This may disappoint some viewers and, in some cases, may cause certain viewers to cease watching the content that lacks associated supplemental content. Moreover, new content is constantly being distributed to viewers and, as such, it can be difficult to constantly generate new supplemental content.

SUMMARY

In accordance with some implementations of the disclosed subject matter, mechanisms for generating and presenting supplemental content based on contextual information are provided.

In accordance with some implementations of the disclosed subject matter, a method for presenting content to a user is provided, the method comprising: identifying, using a hardware processor, a program based on first media data; identifying, using the hardware processor, one or more keywords associated with the program; determining, using the hardware processor, a popularity score associated with each of the one or more keywords; obtaining, using the hardware processor, one or more properties associated with a particular keyword of the one or more keywords based on the popularity score associated with each keyword; generating, using the hardware processor, supplemental content for the program based on the one or more properties; receiving, using the hardware processor, a request for supplemental content and second media data from a computing device; and upon determining that the second media data corresponds to the program, causing, using the hardware processor, the generated supplemental content to be presented by the computing device.

In accordance with some implementations of the disclosed subject matter, a system for presenting content to a user is provided, the system comprising: a hardware processor that is configured to: identify a program based on first media data; identify one or more keywords associated with the program; determine a popularity score associated with each of the one or more keywords; obtain one or more properties associated with a particular keyword of the one or more keywords based on the popularity score associated with each keyword; generate supplemental content for the program based on the one or more properties; receive a request for supplemental content and second media data from a computing device; and upon determining that the second media data corresponds to the program, causing, using the hardware processor, the generated supplemental content to be presented by the computing device.

In accordance with some implementations of the disclosed subject matter, a non-transitory computer-readable medium containing computer executable instructions that, when executed by a processor, cause the processor to perform a method for presenting content to a user is provided. The method comprising: identifying a program based on first media data; identifying one or more keywords associated with the program; determining a popularity score associated with each of the one or more keywords; obtaining one or more properties associated with a particular keyword of the one or more keywords based on the popularity score associated with each keyword; generating supplemental content for the program based on the one or more properties; receiving a request for supplemental content and second media data from a computing device; and upon determining that the second media data corresponds to the program, causing the generated supplemental content to be presented by the computing device.

In accordance with some implementations of the disclosed subject matter, a system for presenting content to a user is provided. The system comprising: means for identifying a program based on first media data; means for identifying one or more keywords associated with the program; means for determining a popularity score associated with each of the one or more keywords; means for obtaining one or more properties associated with a particular keyword of the one or more keywords based on the popularity score associated with each keyword; means for generating supplemental content for the program based on the one or more properties; means for receiving a request for supplemental content and second media data from a computing device; and, upon determining that the second media data corresponds to the program, means for causing the generated supplemental content to be presented by the computing device.

In some implementations, the system further comprises: means for receiving an audio fingerprint representing audio data that corresponds to the program; means for comparing the received audio fingerprint with a plurality of audio fingerprints relating corresponding to media content; and means for identifying the program based on the comparison.

In some implementations, the system further comprises: means for receiving a channel corresponding to the program; means for retrieving at least one of subtitle data, video data, and metadata associated with the program based on the received channel; and means for using an image recognition technique on the subtitle data, the video data, or the metadata to identify the one or more keywords associated with the program, wherein the image recognition technique is selected from at least one of: optical character recognition, image recognition, and facial recognition.

In some implementations, the system further comprises: means for obtaining popularity information associated with each of the one or more keywords, wherein the popularity information includes at least one of: search popularity information relating to the keyword, social network popularity information relating to the keyword, and a number of web pages containing the keyword; means for assigning a weight to each piece of obtained popularity information; and means for generating the popularity score based on the assigned weight.

In some implementations, the system further comprises: means for ranking the one or more keywords associated with program based on the popularity score; and means for selecting the particular keyword based on the ranking.

In some implementations, the supplemental content includes at least one of a quiz question and a poll question.

In some implementations, the system further comprises means for causing the generated supplemental content to be presented on a mobile device associated with the computing device in response to receiving the request for supplemental content from the computing device.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements

DETAILED DESCRIPTION

Figure 1:
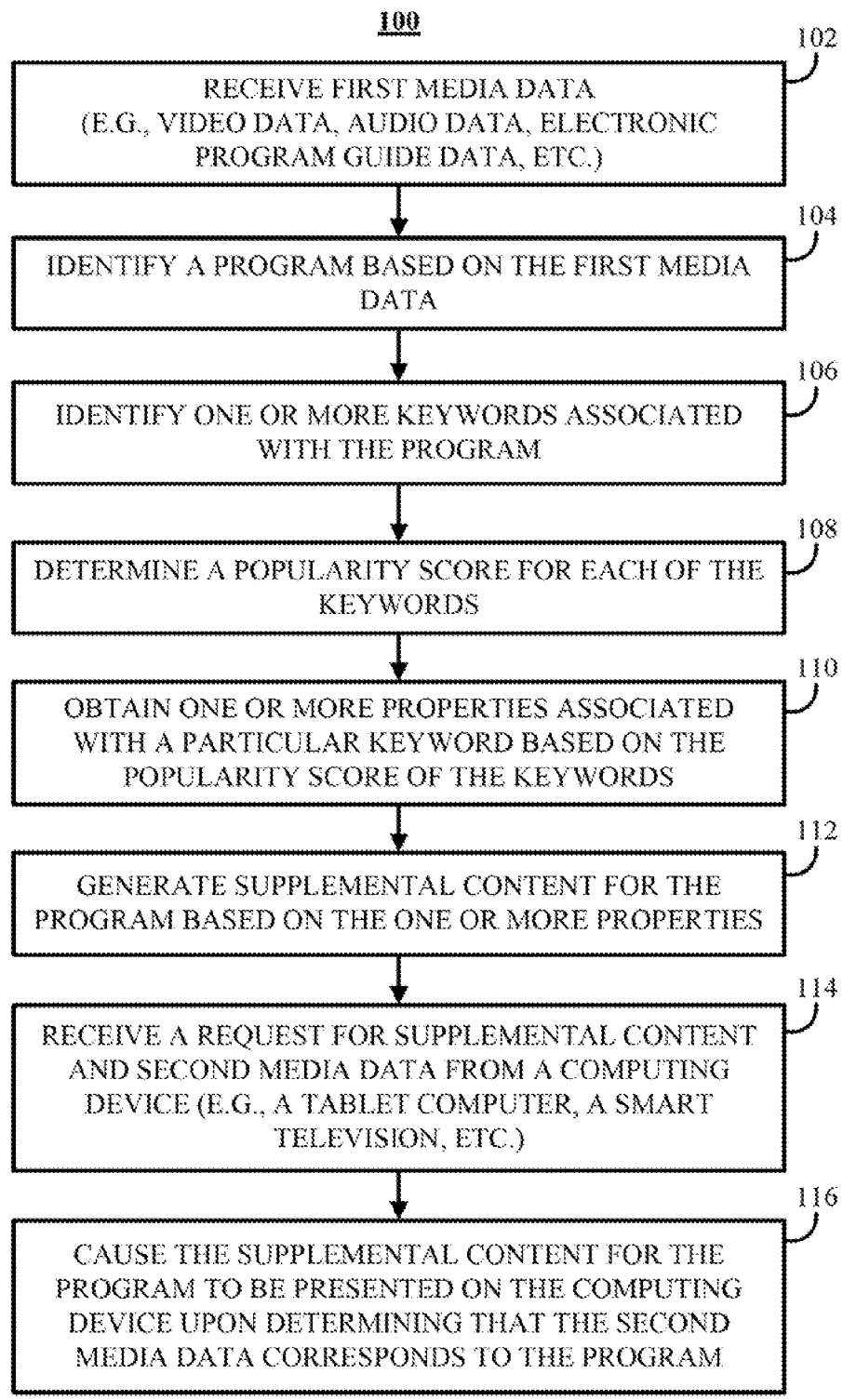
FIG. 1 shows an example of a process for generating and presenting supplemental content based on contextual information in accordance with some implementations of the disclosed subject matter.

In accordance with some implementations of the disclosed subject matter, mechanisms for generating and presenting supplemental content based on contextual information are provided.

In some implementations, media data related to various programs can be captured and used to generate keywords associated with the program. For example, video data, audio data, electronic program guide data, and/or subtitle data related to a program can be retrieved and/or captured. In a more particular example, an audio fingerprint of the audio data provided by the program can be generated, where the audio fingerprint is compared with audio fingerprints of known programs to determine the channel that a user is currently tuned. The channel information can then be used to retrieve video data, audio data, electronic program guide data, subtitle data, and/or other data relating to the program presented on the channel, which can analyzed to extract one or more keywords.

In some implementations, various keywords can be extracted from the media data using any suitable techniques, such as facial recognition, image recognition, optical character recognition, or any other suitable techniques. For example, actors and actresses associated with a program can be extracted as keywords. As another example, landmarks (e.g., the Eiffel Tower) included in video data associated with a program can be extracted as keywords. It should be noted that extracted keywords can include any suitable entities, topics, characteristics, and/or features relating to the media data.

In some implementations, a popularity score can be determined for each keyword that is extracted from the media data associated with the program. Additionally, keywords with a relatively low popularity score can be discarded and properties of the keywords with a relatively higher popularity score can be found. Such properties can include popular information about each of the keywords, such as height of a tall building or landmark, net worth of a well-known wealthy person, birthplace of a person, population of a city, etc.

In some implementations, supplemental content, such as a quiz or a poll, can be generated based on a particular property of a particular keyword. In some cases, the most popular property of a keyword (e.g., a property that is searched for most often in association with a particular keyword) can be used as the basis for supplemental content. For example, if a keyword chosen to be used as the basis for a question is the "Statue of Liberty," a property used to generate a question may be the name of the artist that designed the statue. Additionally, a quiz question can be generated that asks a user "who designed the Statute of the Liberty?" and incorrect answers to the question can be generated based on other properties of the keyword (e.g., properties related to the Statue of Liberty) or based on properties of the correct answer. For example, the correct answer to the question "Who designed the Statue of Liberty" is Frederic Bartholdi, who is a French sculptor. Incorrect answers can be generated by determining the names of other people associated with the statue of liberty, such as other artists associated with the Statue of Liberty, other French people, other French artists, other sculptors that lived during the time when the Statue of Liberty was built, etc.

It should be noted that the popularity score can be based on any suitable popularity information, such as search popularity information that provides an indication of the popularity of a given keyword in search queries (e.g., search engine data), social network popularity information that provides an indication of the occurrence of a given keyword in one or more social media sources (e.g., social messaging sources), and the number of times a given keyword occurs within a set of webpages.

In some implementations, supplemental content can be requested by a user using a computing device, such as a television, a smart television, a digital media receiver, a digital video recorder, a set-top box, a personal computer, a game console, a smartphone, a tablet computer, or any other suitable media device. In response, the user can be presented with supplemental content, such as a poll or a quiz, that is based on a current program. Alternatively, in response to the computing device being associated with a second screen device (e.g., a tablet computer connected with the computing device over a suitable communications network), the computing device can transmit the request for supplemental content associated with the current program and the second screen device can receive the supplemental content for presenting to the user.

These mechanisms can be used in a variety of applications. For example, these mechanisms can be used to generate supplemental content for any program that is captured using the mechanisms described herein. As another example, these mechanisms can be used to generate interactive content that keeps viewers of a program engaged with the program. As yet another example, these mechanisms can be used to generate relevant or topical supplemental content in real-time during a program's original run or when a user chooses to playback content (e.g., over-the-top content, recorded content, etc.). As still another example, these mechanisms can generate supplemental content for a program without requiring a person to know what will be relevant to the program or spend time assembling information or writing supplemental content.

Turning to FIG. 1, an illustrative example 100 of a process for generating and presenting supplemental content based on contextual information is shown in accordance with some implementations of the disclosed subject matter. In some implementations, a content generation application for generating and/or presenting supplemental content can receive media data at 102. This media data can be related to one or more programs and can include any suitable media data. For example, in some implementations, media data can include video data, audio data, electronic program guide (EPG) data, subtitle data, metadata, any other suitable data, or any suitable combination of such data. In a more particular example, media data can include an audio fingerprint that is generated by an application executing on a mobile device based on captured audio data. The audio fingerprint can be transmitted from the mobile device to the content generation application for determining the program being watched by the user or other further processing.

In some implementations, the content generation application can record signals related to one or more programs from various sources, such as programs broadcast over-the-air, programs broadcast by a cable television provider, programs broadcast by a telephone television provider, programs broadcast by a satellite television provider, on-demand programs, over-the-top programs, Internet content, streaming programs, etc.

Using the recorded signals, the content generation application can extract media data that can include, for example, audio fingerprints from audio data corresponding to known programs, subtitles information from programs, screenshots and/or video clips from video information corresponding to known programs, media guidance information, etc. For example, audio fingerprint data can be extracted from audio data associated with a program using any suitable techniques for extracting an audio fingerprint from the audio data. As another example, subtitle data can be extracted from closed captioning information associated with the recorded signal of a program, or can be generated based on audio data using any suitable techniques for generating subtitle information from audio data. As yet another example, screenshots can be extracted from video data associated with a program using any suitable techniques for extracting a screenshot from the video data. As still another example, guidance data, such as program title, episode title, season number, episode number, cast, a plot summary, running time, original air date and/or time, or any other suitable information provided in an electronic program guide can be extracted from electronic program guide information associated with a program using any suitable techniques. As a further example, metadata (e.g., information about the program) associated with a signal recorded by the content generation application can be extracted from the recorded signal of the program using any suitable techniques. It should be noted that any suitable media data can be extracted from the signals recorded by the content generation application. In particular, any media data that can be used to identify a program and/or identify keywords associated with a program can be extracted from the recorded signal.

In some implementations, media data can be extracted from signals related to one or more programs by a third party, and the media data can be received by the content generation application, in addition to or instead of the content generation application recording the signals and extracting media data from the signals.

At 104, the content generation application can identify a program that the media data is associated with using any suitable techniques. For example, the content generation application can determine an identity of the program based on a title of the program provided in an electronic program guide. As another example, the content generation application can identify the program based on matching a fingerprint extracted from the audio of the program to a fingerprint of audio associated with a particular program (e.g., from a database of program audio fingerprints, or the like). As yet another example, the content generation application can identify the program based on a date and time when the signals related to the program were captured. It should be noted that any suitable techniques for identifying a program can be used at 104. It should also be noted that, in some implementations, an identity of the program can be received in association with media data related to the program.

In some implementations, the identity of the program can be recorded and associated with the media data received at 102. For example, the content generation application can maintain a database containing the entry for each identified program, and media data received at 102 can be stored in association with an entry for the program that the media data is related to. As another example, a file can be maintained in a memory for each identified program and media data related to the program can be stored in the file that corresponds to that program.

At 106, the content generation application can identify one or more keywords associated with the program identified at 104. In some implementations, keywords can correspond to and represent entities from the program. For example, keywords can include people, places, events, objects, creatures, logos, characteristics, features, or any other suitable entity related to the program. These keywords can be associated with the program in various ways. For example, an image of a person or a landmark can be included in a video signal associated with the program. As another example, a person or an event can be discussed in the program (e.g., the names of people or words identifying an event can be included in an audio signal or subtitles associated with the program). As yet another example, a place can be identified in a program through text included in a video signal associated with the program or through audio associated with the program. As still another example, keywords can be included in text associated with the program such as metadata, electronic program guide data, subtitles, or the like. It should be noted that the preceding are merely examples and it is recognized that keywords can be associated with a program in many different ways.

Any suitable techniques can be used to identify keywords associated with the identified program. For example, in some implementations, keywords associated with the program can be identified based on a cast of the program extracted from metadata, based on electronic program guide data, or found by searching a database of cast information for programs that can be searched using the title of a program. As another example, keywords associated with the program can be identified based on facial recognition techniques to identify people included in one or more screenshots from video data associated with the program. As yet another example, keywords associated with the program can be identified based on image recognition techniques to identify landmarks included in one or more screenshots extracted from video data associated with the program. As still another example, keywords associated with the program can be identified based on optical character recognition techniques to identify keywords included in one or more screenshots extracted from video data associated with the program.

In some implementations, keywords can be associated with a particular time in a program. For example, an identity of a person that appears in the program can be a keyword, and the times when the person appears in the program can be associated with that person. If that same person is also a cast member of the program, the keyword for the person can also be associated with the program as a whole with no particular time connected to it. As another example, keywords that appear in metadata or electronic program guide data can be associated with the program without also being associated with a particular time. As yet another example, text that appears in a program can be associated with a time when the text appears in the video data, audio data, subtitle data, etc.

At 108, the content generation application can determine a popularity score for each of the keywords identified in 106. The popularity score can be determined using any suitable techniques. For example, in some implementations, the popularity score can be based on search popularity information that provides an indication of the popularity of the keyword in search queries (e.g., a number of times the keyword is used as a search term). As another example, the popularity score can be based on social popularity information that provides an indication of the popularity of the keyword in social media sources (e.g., a number of times the keyword occurs in one or more social media platforms). As yet another example, the popularity score can be based on a number of web pages that include the keyword or a number of results that are returned for a search of the keyword. It should be noted that the preceding are merely examples and it is recognized that the popularity of keywords can be determined in many different ways.

In some implementations, the popularity score of keywords can be weighted based on relevance to the program that the keywords are associated with. For example, a popularity score for a keyword that corresponds to a cast member of a program can be increased. In another example, a popularity score for food related keywords associated with a program in a food category (e.g., cooking shows) can be increased. In yet another example, a popularity score for a keyword that is found to be unrelated to a category or topic of the program can be lowered. In a further example, search popularity information can be assigned a higher weight than social network popularity information.

At 110, the content generation application can obtain one or more properties associated with a particular keyword based on the popularity score of the keywords determined at 108. In some implementations, properties can be obtained for keywords with high popularity scores relative to other keywords associated with a program. For example, keywords with a relatively low popularity score can be discarded based on a threshold. In another example, keywords can be ranked based on the popularity score of the keywords determined at 108 and a predetermined number of keywords can be kept from the ranked list (e.g., top five keywords in the ranked list). In yet another example, multiple lists of ranked keywords can be generated based on different popularity information, such as a ranked list of keywords where the popularity score is based on search popularity information and a ranked list of keywords where the popularity score is based on social network popularity information.

In some implementations, properties of a keyword can include information related to the keyword. For example, if a keyword is a well-known wealthy individual, a property for such a keyword can be the net worth of that individual. In another example, if the keyword is a landmark, such as the Eiffel Tower or the Space Needle, a property for such a keyword can be the height of the landmark. In yet another example, if the keyword is an object of interest, such as the Liberty Bell, a property can be a year that the object was made. In a further example, if the keyword is a publicly traded company, a property can be a recent stock price of that company. In a further example, if the keyword is an ingredient used in cooking, a property can be dishes that the ingredient is used in preparing. As a still further example, if a keyword corresponds to a contestant on an elimination-based reality program, a property can be whether the contestant has been eliminated from the elimination-based reality program.

In some implementations, properties of a keyword can be based on the popularity of the properties in association with the keyword. For example, search terms that correspond to properties and that are used more often with the keyword can be determined to be more popular properties. Returning to an example described above, users that search for a particular well-known wealthy person may be interested in the net worth of the person. Consequently, net worth of the wealthy person may be a more popular property associated with the wealthy person than the individual's birthday or spouse. Similarly, the height of a tall landmark may be more interesting to users of a search engine than other properties of the landmark, such as a date when the landmark was built or an architect of the landmark. As another example, if a keyword is a place such as a city, town, country, etc., the population may be a more popular property of the place than other properties such as the average rainfall, or the head of government of the place.

In some implementations, a specified number of properties can be associated with each keyword, or all properties over a certain popularity threshold can be associated with each keyword. Additionally or alternatively, certain properties can always be associated with a keyword based on a category of the keyword. For example, a date of birth (if known) can always be included for a keyword that corresponds to a person (especially a real person, e.g., not a fictional character). As another example, an address can always be included for a keyword that corresponds to a building or landmark.

In some implementations, properties associated with keywords and the relative popularity of the properties can be stored in a database of keywords. In a more particular example, the database of keywords can group particular keywords or entities with various properties of interest. In such an example, the content generation application can access the database and retrieve a particular number of properties (e.g., the first property and the second property associated with a particular keyword). Such a database can be maintained by the content generation application, by another application, or by a third party. In cases where the database is not maintained by the content generation application, the content generation application can access the database using any suitable techniques, such as through an application programming interface (API). Additionally or alternatively, properties and/or popularity scores for properties can be generated for keywords on an as-needed basis when the keyword is identified using any suitable techniques.

At 112, the content generation application can generate supplemental content for the program identified at 104 based on the one or more properties associated with the keywords or based on the keywords themselves. In some implementations, any suitable supplemental content can be generated for the program. For example, factual content related to the keywords can be generated, such as biographical information about people appearing in the program, information about a place where the program takes place, and the like. Factual content can also include posts, articles, web pages, etc., related to the keywords. As another example, interactive content related to the keywords can be generated, such as a poll or a quiz related to the one or more properties. In a more particular example, upon identifying an object in an image screenshot of a program as the Eiffel Tower and determining that the first property associated with the keyword Eiffel Tower is the height of the Eiffel Tower, the content generation application can generate a quiz question that asks the viewer "What is the height of the Eiffel Tower?" and provide multiple answers for selecting using a user input device (e.g., a remote control).

Figure 2:
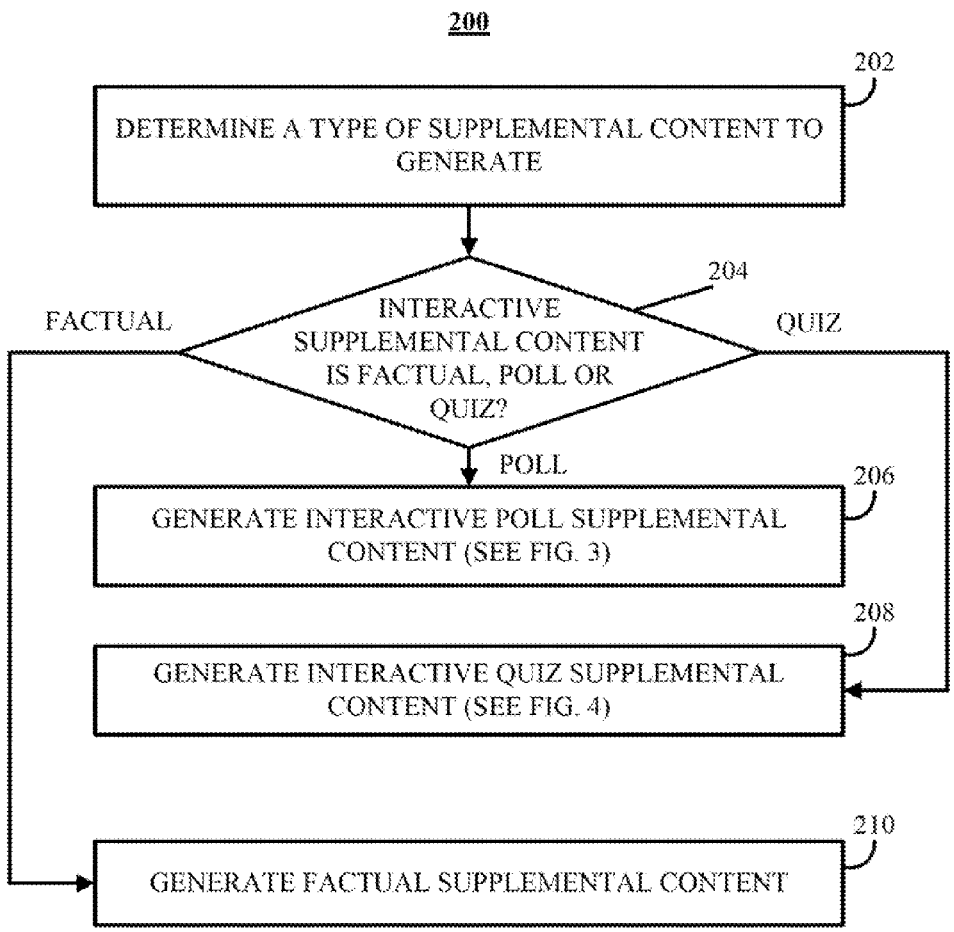
FIG. 2 shows an example of a process for generating supplemental content based on contextual information in accordance with some implementations of the disclosed subject matter.

FIG. 2 shows an example 200 of a process for determining a type of supplemental content to generate in accordance with some implementations of the disclosed subject matter. At 202, the content generation application can determine a type of supplemental content to generate.

In some implementations, the type of supplemental content to generate can be determined based on various factors, such as the genre of the program, the keyword(s) which form the basis of the supplemental content, a previous type of supplemental content that was generated, etc. For example, factual content can be generated with more frequency for news programs or documentary programs than for scripted programs or reality programs. As another example, if the supplemental content that was previously generated for a program by the content generation application was a quiz, the content generation application can be less likely to generate quiz-type supplemental content. As yet another example, if the keyword is a contestant on an elimination-based reality program the content generation application can be more likely to generate a poll about whether that contestant should be eliminated or whether that contestant will win.

The determination of which type of supplemental content is to be generated can be passed to 204. If the type of supplemental content to be generated is a poll ("POLL" at 204), the content generation application can generate a poll as supplemental content at 206, which is described further in connection with FIG. 3. If the type of supplemental content to be generated is a quiz ("QUIZ" at 204), the content generation application can generate a quiz as supplemental content at 208, which is described further in connection with FIG. 4. If the type of supplemental content to be generated is factual content ("FACTUAL" at 204), the content generation application can generate factual supplemental content at 210. For example, as described above, the content generation application can generate factual information based on the properties and/or keyword to be presented as supplemental content.

Figure 3:
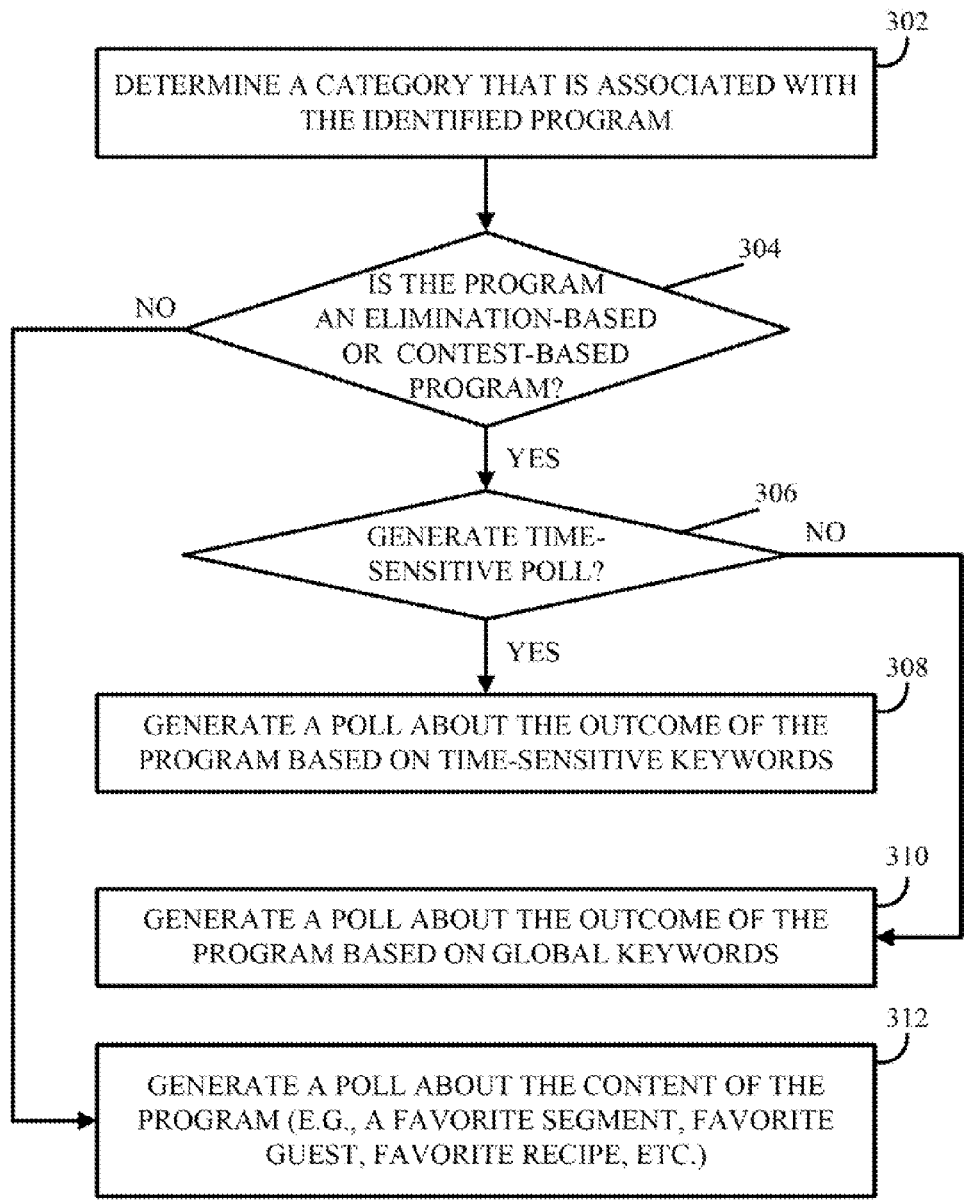
FIG. 3 shows an example of a process for generating an interactive poll based on contextual information in accordance with some implementations of the disclosed subject matter.

FIG. 3 shows an illustrative example 300 of a process for generating a poll in accordance with some implementations of the disclosed subject matter. Process 300 can be used, for example, to generate supplemental content at 112 described in connection with FIG. 1, or at 210 described in connection with FIG. 2. At 302, the content generation application can determine a category or genre associated with the identified program. In some implementations, various levels of categorization can be used to determine a particular category in which the identified program belongs. For example, programs can be divided into scripted programs and reality programs. As another example, reality programs can be divided into non-contest-based (or non-elimination-based) reality programs and contest-based (or elimination-based) reality programs in which contestants may be eliminated or in which a contestant may win (examples can include game shows where a contestant usually wins on every episode of the program, reality programming where contestants are eliminated throughout the program, etc.). As another example, programs can be divided into genres, such as drama, situation comedy, game shows, etc. It should be noted that any suitable categories can be used to categorize programs and any suitable techniques can be used to determine a category or categories to which a program belongs.

At 304, the content generation application can determine whether the program is an elimination-based or contest-based program. If the program is not elimination-based or contest-based ("NO" at 304), the content generation application can generate a poll about the content of the program at 312. For example, a poll can be generated that asks users to pick their favorite segment of the program, their favorite guest on the program (e.g., if the program is a talk show or the like), their favorite recipe from the program (e.g., if the program is a cooking show), etc.

Otherwise, if the program is elimination-based or contest-based ("YES" at 304), the content generation application can generate a poll about the outcome of the program. For example, a poll can be generated that asks users to pick who they think will be eliminated from the program, who they think will win, who they think should be eliminated from the program, whether they think a particular person will be eliminated in a particular episode (e.g., "Will Bill be eliminated this week?").

At 306, the content generation application can determine whether to generate a time-sensitive poll based on keywords associated with a particular point-in-time of the program, or a poll that is not time-sensitive and is based on keywords associated with the program as a whole and not necessarily associated with any particular time. If the content generation application determines that a time-sensitive poll will be generated ("YES" at 306), the content generation application can proceed to 308.

At 308, the content generation application can generate a time-sensitive poll about the outcome of the program based on time-sensitive keywords. As described above, keywords that are identified from time-based data, such as audio data, video data, subtitle data, etc., can be associated with a time when the keyword appeared in the data. For example, when a contestant on an elimination-based program appears on-screen or is discussed in audio, a keyword associated with the contestant, such as their name or a team name, can be associated with these times.

In some implementations, a poll question about a particular keyword can be presented when that keyword is relevant. For example, when a contestant on an elimination-based program appears on screen or is discussed for a certain proportion of a period of time (e.g., 50% of the last three minutes, 25% of the last ten minutes, or any other suitable proportion or time period), a poll question about that contestant can be generated and/or presented. In order to facilitate the generation of time sensitive poll questions, in some implementations, a running tally can be kept for keyword regarding how much time the each keyword has appeared. This can allow the content generation application to generate time-sensitive questions that are relevant.

If the content generation application determines that a non-time-sensitive poll will be generated ("NO" at 306), the content generation application can proceed to 310. At 310, the content generation application can generate a poll that is not time-sensitive. In some implementations, a non-time-sensitive poll can be generated based on global keywords that are applicable to the program in general and not to any particular period of time in the program. For example, in some implementations, keywords used to generate a non-time-sensitive poll can be keywords that are extracted from metadata or electronic program guide data that is applicable to the program generally.

In some implementations, content-based polls, such as those described in connection with 312, can be generated for contest-based or elimination-based programs and outcome-based polls, such as those described in connection with 308 and 310, can be generated for other types of programs where the program has an outcome (e.g., crime shows, where users can be polled to ask who they think is the killer, or the like).

In some implementations, time-sensitive polls, such as those described in connection with 308, can be generated for programs that do not have a particular outcome and that are not elimination-based or contest-based programs. For example, for a talk show program a poll can be generated when a particular guest appears on-screen for a certain proportion of a period of time, a poll can be generated based on a keyword that is being discussed, such as project that is being discussed (e.g., a movie, a book, etc.), or about a keyword that is a property of the guest (e.g., a recently released movie, an upcoming book, etc.).

Additionally or alternatively, the type of poll generated can be based on a previously generated poll. For example, if a most recently generated poll was a poll asking which contestant should be eliminated, a different type of poll can be generated or a follow-up poll can be generated asking who users think should win or not be eliminated.

In some implementations, the content generation application can generate choices for the poll using any suitable techniques. For example, when asking about a particular contestant on an elimination-based reality program, the content generation application can determine that "yes" and "no" are appropriate choices for the poll. As another example, when asking about which contestant should win a contest, the content generation application can determine that the names of the other contestants on the show are appropriate choices for the poll. As yet another example, when asking about users' favorite segment of a program, the content generation application can determine that keywords associated with each segment are appropriate choices for the poll.

In some implementations, poll questions can be generated based on user-generated content. For example, the content generation application can identify user-generated content related to a program, such as posts on social media sources, comments to posts related to the program, etc. The content generation application can determine whether any of the user-generated content contains a question about the program (e.g., through analysis of the language used in the user-generated content, through the presence of punctuation that indicates a question such as a question mark, etc.). The content generation application can then choose a question from the user generated content to use as the basis for a poll (or quiz), using any suitable techniques, such as choosing a question based on the popularity of the poster, the popularity of the question, the frequency with which similar questions are asked by user's in the user-generated content, or any other suitable techniques. Finally, the content generation application can generate possible answers to the question using, for example, the techniques described above, and can cause the question to be presented to users.

Figure 4:
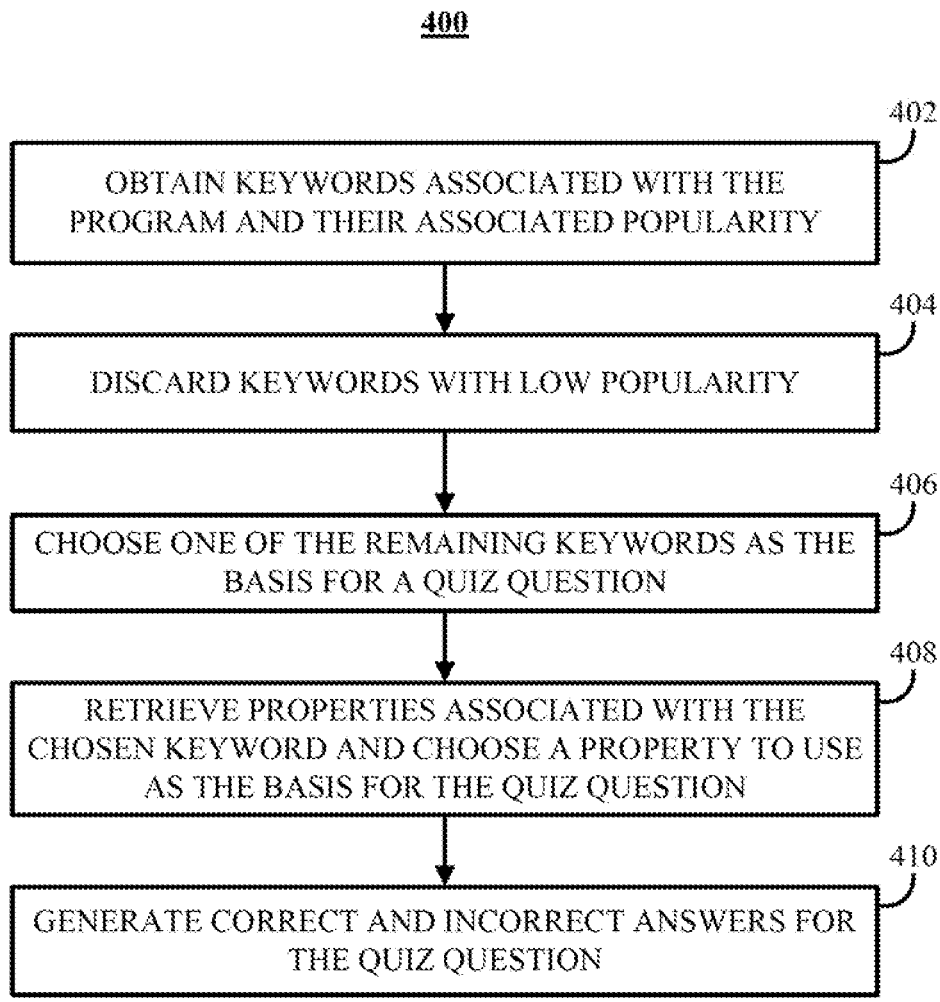
FIG. 4 shows an example of a process for generating an interactive quiz based on contextual information in accordance with some implementations of the disclosed subject matter.

FIG. 4 shows an example 400 of a process for generating a quiz in accordance with some implementations of the disclosed subject matter. Process 400 can be used, for example, to generate supplemental content at 112 described in connection with FIG. 1, or at 212 described in connection with FIG. 2. At 402, the content generation application can obtain one or more keywords associated with the program and the popularity associated with those keywords. These keywords can be obtained from any suitable source such as from a database of keywords associated with the program, from data related to the program as the data is recorded and/or analyzed to extract keywords, or any other suitable source.

In some implementations, the keywords that are obtained can be associated with the program as a whole, a program that represents a particular episode of a related series of programs, or a particular time within a program. For example, the keywords can be relevant to the entire program, to a particular time in the program, or both. Additionally, as described above in connection with FIG. 3, a list of keywords relevant to particular periods of time can be maintained and updated periodically.

At 404, keywords that have relatively low popularity scores associated with them can be discarded. Any suitable techniques can be used to determine which scores to keep and which to discard. For example, a most popular keyword can be kept and any other keywords obtained can be discarded. As another example, keywords over a threshold popularity score can be kept and any below the threshold discarded. As yet another example, keywords that are relevant to a particular time can be kept and any that are not relevant can be discarded. As still another example, keywords that have already been used or have recently been used (e.g., used in the last ten minutes) to generate a poll can be discarded. As a further example, a combination of such techniques can be used to keep and discard keywords. It should be noted that, in some implementations, all keywords can be kept with no keywords being discarded (e.g., one or more keywords can be randomly or pseudo-randomly selected from the obtained keywords).

At 406, the content generation application can choose a keyword from the remaining keyword(s) as the basis for a quiz. The keyword can be chosen using any suitable techniques. For example, a keyword can be chosen randomly. As another example, a keyword can be chosen based on previously chosen keywords (e.g., a keyword that was used recently can be avoided, a type of keyword such as person, place, etc., used recently can be avoided, etc.).

At 408, the content generation application can retrieve the properties associated with the keyword chosen at 406 and can choose a property on which to base a quiz question. As described above in connection with 110 of FIG. 1, properties can be obtained from any suitable source. The property can be chosen using any suitable techniques. For example, a property having a highest popularity can be chosen. As another example, a property can be chosen randomly. As another example, a property can be chosen based on previously chosen keywords (e.g., a property that was used recently can be avoided, a type of property such as birthplace, height, net worth, etc., used recently can be avoided, etc.).

At 410, the content generation application can generate correct and incorrect answers for the quiz question. The correct and incorrect answers can be generated using any suitable techniques. For example, in some implementations, where the property that is used as the basis for the answer is a numerical quantity, the incorrect answers can be generated as a fraction or multiple of the correct answer. In a more particular example, if the Eiffel Tower is chosen as a keyword and the property that is chosen is height, the correct answer can be the height of the Eiffel Tower and the incorrect answer can be fractions or multiples of the height of the Eiffel Tower. In some implementations, the amount that the correct answer is multiplied by can be chosen at random from a set range, such as from 25% to 200%, or any other suitable range. It should be noted that the correct and incorrect answers can be formatted in a similar fashion, e.g., can be presented in similar units and/or with a similar number of decimal places.

In some implementations, where the property that is used as the basis for the answer is text, the incorrect answers can be generated based on other properties of the same type that are related to the keyword or other keywords that are related to the correct answer in some way and are of the same type as the correct answer. In such implementations, the related properties can be related to the answer directly as being another property associated with the keyword chosen at 406, a property of another keyword that was not chosen, related to the property information, and/or related in any other suitable way. For example, for a quiz question based on a birthplace property for the keyword "Elvis Presley" the correct answer is "Tupelo, MS." Incorrect answers can be based on other location-type properties associated with "Elvis Presley" such as the location where Elvis Presley died, "Memphis, Tenn.". Another incorrect answer can be based on a location-type property related to the answer itself. For example, "Jackson, MS" can be used as an incorrect answer because it is the capital of the state where "Tupelo, MS" is located.

In some implementations, the location of the correct and incorrect answers within a list of possible answers to a quiz can be randomized. It should be noted that the location of the answers can be randomized once when the quiz is generated or each time the quiz is presented to a user.

In some implementations, the answers to the quiz can be fixed such that if the quiz question is presented to a user more than once (e.g., by the property being used to generate more than one question, by the user refreshing a question, etc.) the answer is not given away by presenting the correct answer with different incorrect answers.

Returning to FIG. 1, at 114, the content generation application can receive a request for supplemental content and second media data from a computing device. In some implementations, the second media data can include any suitable data for identifying a program that the supplemental content is being requested in connection with. For example, the second media data can be an identification of a program (e.g., a title, a channel identification and air time, etc.) being presented by the computing device or a device coupled to the computing device (e.g., the computing device is a set-top box, a television, etc.). As another example, the second media data can include a portion of audio data of the program (e.g., one second of audio, five seconds of audio, etc.) that can be fingerprinted and matched to audio data recorded by the content generation application (e.g., the computing device is a tablet computer, a smartphone, a wearable computer, etc., that can record and transmit audio information of the program). As yet another example, the second media data can include an indication from a user of a program being presented to the user. As still another example, the second media data can include a screenshot of the program being presented to the user captured by a user using a computing device (e.g., a camera, a camera of a tablet computer, a camera of a smartphone, a camera of a wearable computer, etc.) or from a stream of video (e.g., by a set-top box, television, etc., that is being used to present the program) that can be matched to screenshots captured by the content generation application.

At 116, the content generation application can cause the supplemental content generated for the program to be displayed to the user on a client device, such as a computing device that requested supplemental content or a device coupled to the computing device that requested supplemental content. For example, in some implementations, if the computing device that requested the supplemental content is a set-top box connected to a television, the content generation application can cause the set-top box to present supplemental content to the television. As another example, if the computing device that requested the content is a set-top box or smart television connected to one or more second screen devices, such as a tablet computer, smartphone, wearable computer, laptop computer, etc., the supplemental content can be presented using the second screen device in addition to or instead of the computing device that requested the content. As still another example, if the computing device that requested the content is a second screen device, the supplemental content can be presented using the second screen device.

In some implementations, a user can request supplemental content for a program that is being presented for a first time (e.g., a live program, an original broadcast, a live-streamed program, etc.). In such implementations, the supplemental content can be created while the program is being presented and can be presented to the user as the supplemental content is generated by the content generation application. In some implementations, the content generation application can periodically receive audio fingerprints or channel identification information from a computing device and the content generation application can determine whether to continue providing supplemental content for a program.

In some implementations, a user can request supplemental content for a program that is recorded in a storage medium and is being played to the user (e.g., a program recorded on a digital video recorder (DVR), an on-demand program, an over-the-top program, etc.) or a program that is being presented additional times (e.g., a "rerun" or repeat) but is being displayed in real-time (e.g., the program is not a recorded program that the user can rewind, pause, fast-forward, etc.). In such implementations, the supplemental content can be presented to the user based on a time in the program that is currently being presented to the user. For example, supplemental content can be presented based on keywords that are associated with times that are at or before a time of the program that is currently being presented or keywords that are generally associated with the program. This can prevent supplemental content that might spoil an upcoming part of the program from being presented to a user.

In some implementations, a current time being presented can be determined using any suitable technique. For example, in some implementations, the computing device that requested the supplemental content can transmit a current time of the program being presented. As another example, a computing device that requested the content can periodically capture audio of the program and this audio can be matched (e.g., by the content generation application) to a particular time in the program (e.g., using audio fingerprinting techniques).

In some implementations, all supplemental content generated by the content generation application can be sent to the computing device that requested the supplemental content and the supplemental content can be associated with a time after which the supplemental content can be presented. In such implementations, the computing device can determine when to present supplemental content and/or whether to allow supplemental content to be presented.

Figure 5A:
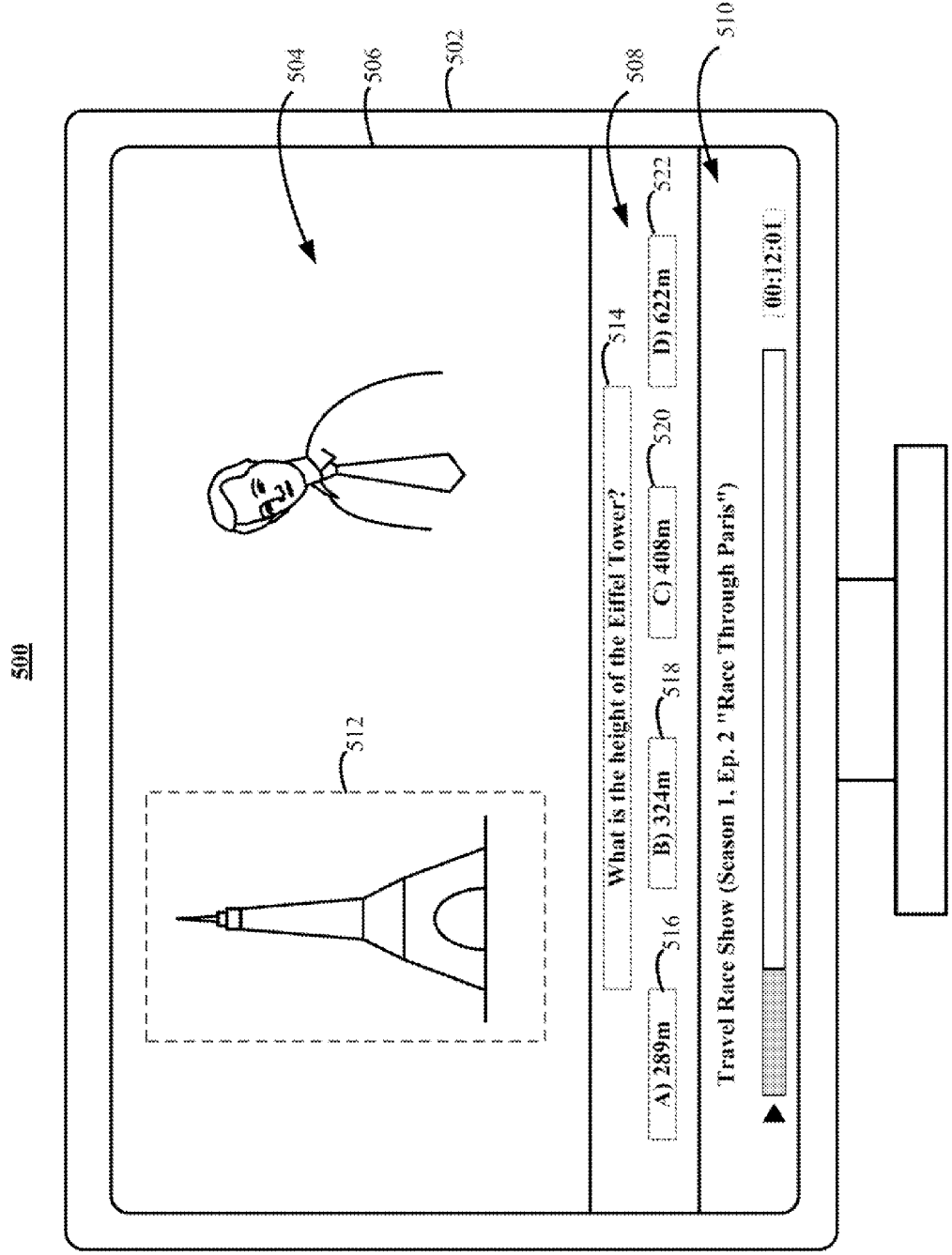
FIGS. 5A and 5B show an example of a user interface for presenting an interactive quiz in accordance with some implementations of the disclosed subject matter.

Turning to FIG. 5A, an illustrative example 500 of a television device displaying a program and a quiz as supplemental content is shown in accordance with some implementations of the disclosed subject matter. In the example of FIG. 5A, a television device 502 is displaying a program 504 (or other suitable media content) on one portion of a display 506 and supplemental content 508 is displayed on another portion of display 506. In the example, program 504 is reduced in size so that supplemental information 508 can be displayed without covering any of the media content being presented in program 504.

In example 500, information 510 about the program, such as might be displayed by an electronic program guide or the like, is also shown. It should be noted that this is shown for explanation and is not otherwise necessary or required. As shown in information 510, the program is identified as "Travel Race Show (Season 1, Episode 2 'Race Through Paris')." At the current time (e.g., 00:12:01 into the program), an image 512 of the Eiffel Tower appears in video data related to program 504. As described above in connection with FIG. 1, upon identifying the program, the content generation application can extract screenshots from video data related to program 504 and use one or more image recognition techniques to determine the keyword "Eiffel Tower", which may be a relatively popular keyword. The content generation application can then use the keyword "Eiffel Tower" to generate a quiz, as described above in connection with, for example, FIG. 4. In example 500, the quiz question 514 can be presented as part of supplemental content 508, along with four possible answers 516-522 to quiz question 514. A user can then be prompted to select an answer to the question (e.g., using a user input device, such as a remote control) or choose not to answer the question. In some implementations, the user can be given the option of ignoring the question.

In some implementations, quiz question 514 can be presented for a predetermined time (e.g., 10 second, 15 seconds, etc.) and, after the predetermined time has elapsed, the content generation application can cause the correct answer to be displayed to the user as shown in connection with FIG. 6, described below.

Figure 5B:
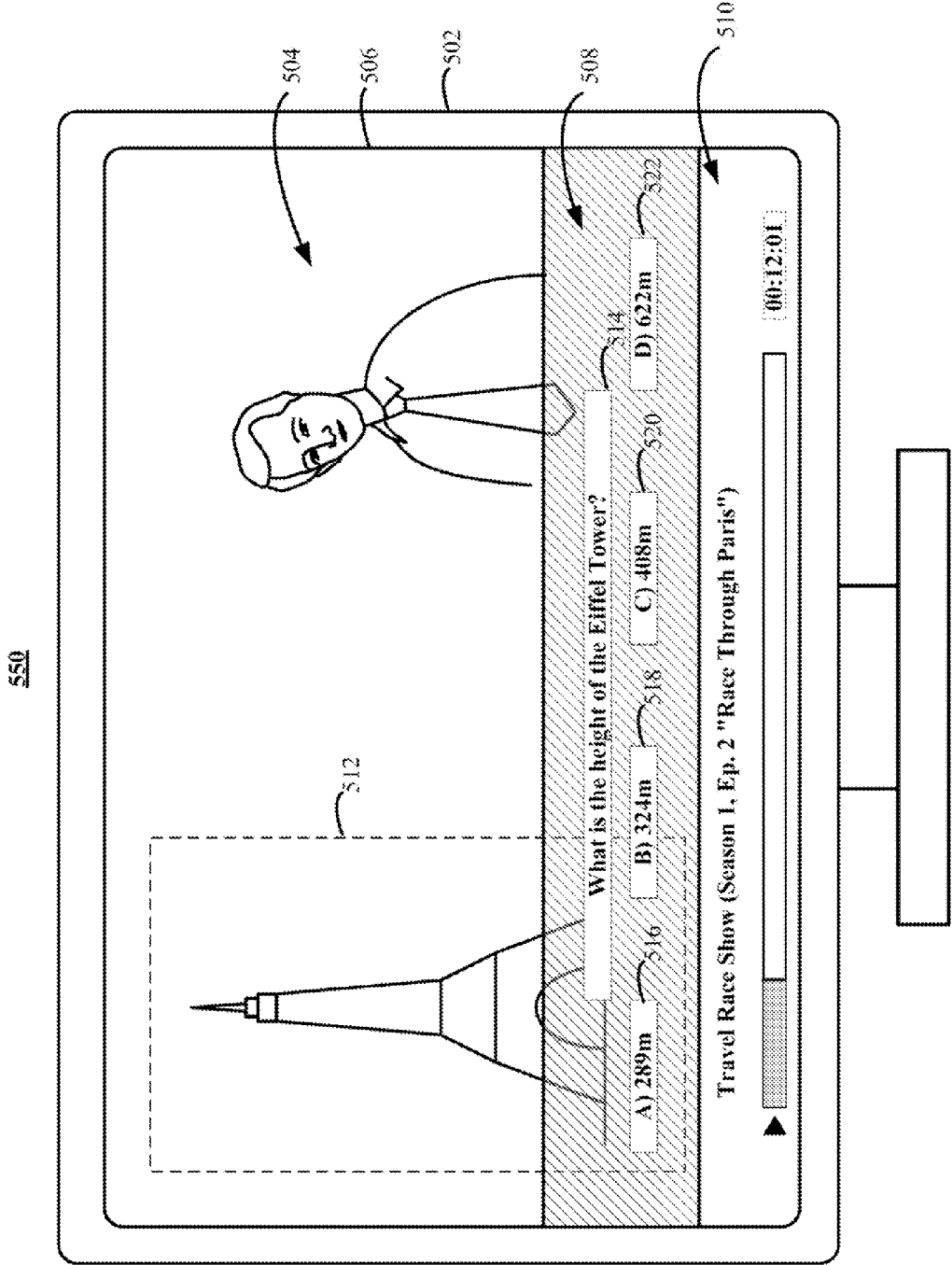

FIG. 5B shows an illustrative example 550 of a television displaying a program and a quiz as supplemental content in which the supplemental content is overlaid on the program in accordance with some implementations of the disclosed subject matter. As shown in example 550, supplemental content 508 can be displayed over program 504 in a transparent or semi-transparent manner. This can, for example, allow program 504 to be presented in the same format as though supplemental content 508 were not presented on television device 502.

Figure 6:
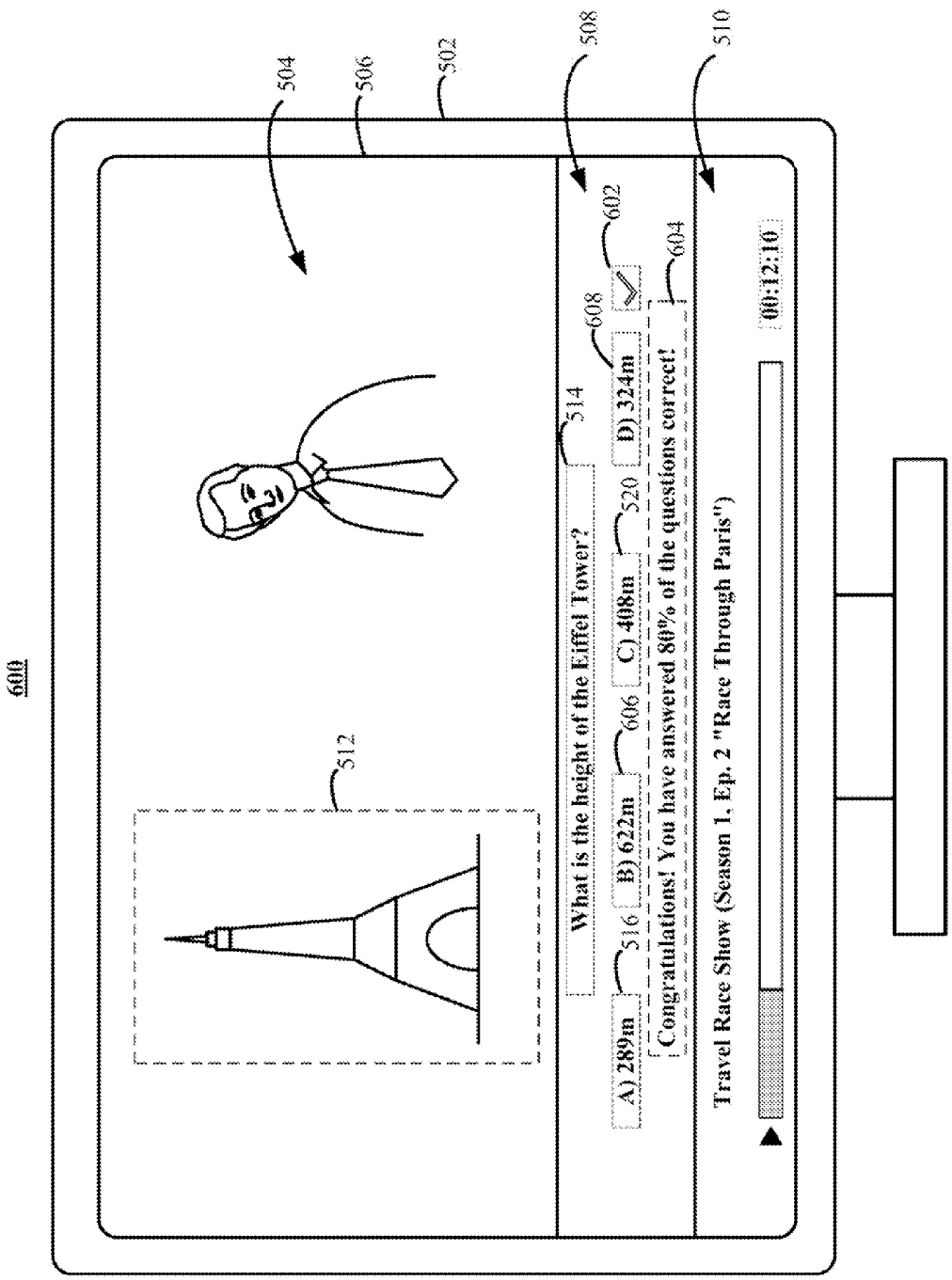
FIG. 6 shows an example of a user interface for presenting an answer to a quiz in accordance with some implementations of the disclosed subject matter.

FIG. 6 shows an illustrative example 600 of a television device displaying a program and a quiz as supplemental content in which the content generation application has indicated the correct answer. As shown in example 600, a correct answer can be indicated by an icon 602, such as a check mark or any other suitable icon. In particular, the answer to question 514 of "What is the height of the Eiffel Tower?" is indicated as answer "D", 324 m. Additionally or alternatively, the correct answer can be highlighted using any suitable techniques, such as an animation, a highlight region, etc.

In some implementations, the content generation application can cause text 604 to appear to the user indicating a number of quiz answers that have been correctly answered so far, a ranking compared to other users, or any other suitable information, such as a fact about the subject of quiz question 514 (e.g., when the Eiffel Tower was built, the architect, etc.).

As also shown in FIG. 6 and as described above in connection with, for example, FIG. 4, the answers shown in example 600 are in a different order than the answer shown in example 500 or 550. In particular, answers 606 and 608 of FIG. 6 are switched with respect to answers 518 and 522 of FIG. 5.

Figure 7:
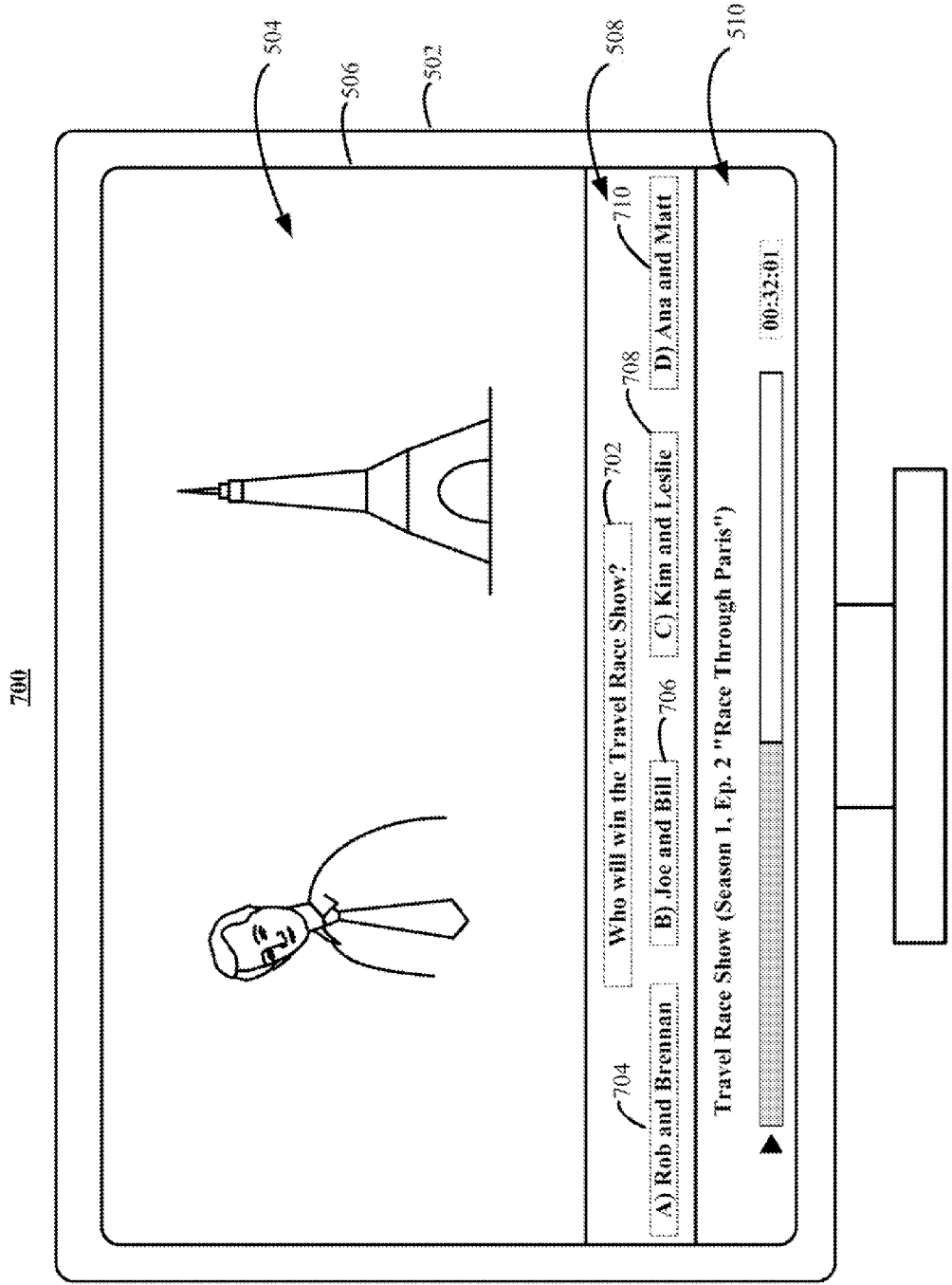
FIG. 7 shows an example of a user interface for presenting an interactive poll in accordance with some implementations of the disclosed subject matter.

FIG. 7 shows an illustrative example 700 of a television device displaying a program and a poll question as supplemental content in accordance with some implementations of the disclosed subject matter. As shown in FIG. 7, a poll question 702 is displayed on television 502 as supplemental content. Question 702 is an example of a non-time-sensitive poll question that is based on keywords that are relevant to the whole program 504 and not to any particular time period. For example, question 702 can be a question asking who will win the contest that is presented as part of program 504. As shown in example 700, question 702 can be presented as part of supplemental content 508, along with four possible answers 704-710. A user can then be prompted to answer question 702 by selecting one of the answers 704-710 (e.g., using a user input device, such as a remote control) or choose not to answer question 702. In some implementations, the user can be given the option of ignoring the question.

Figure 8:
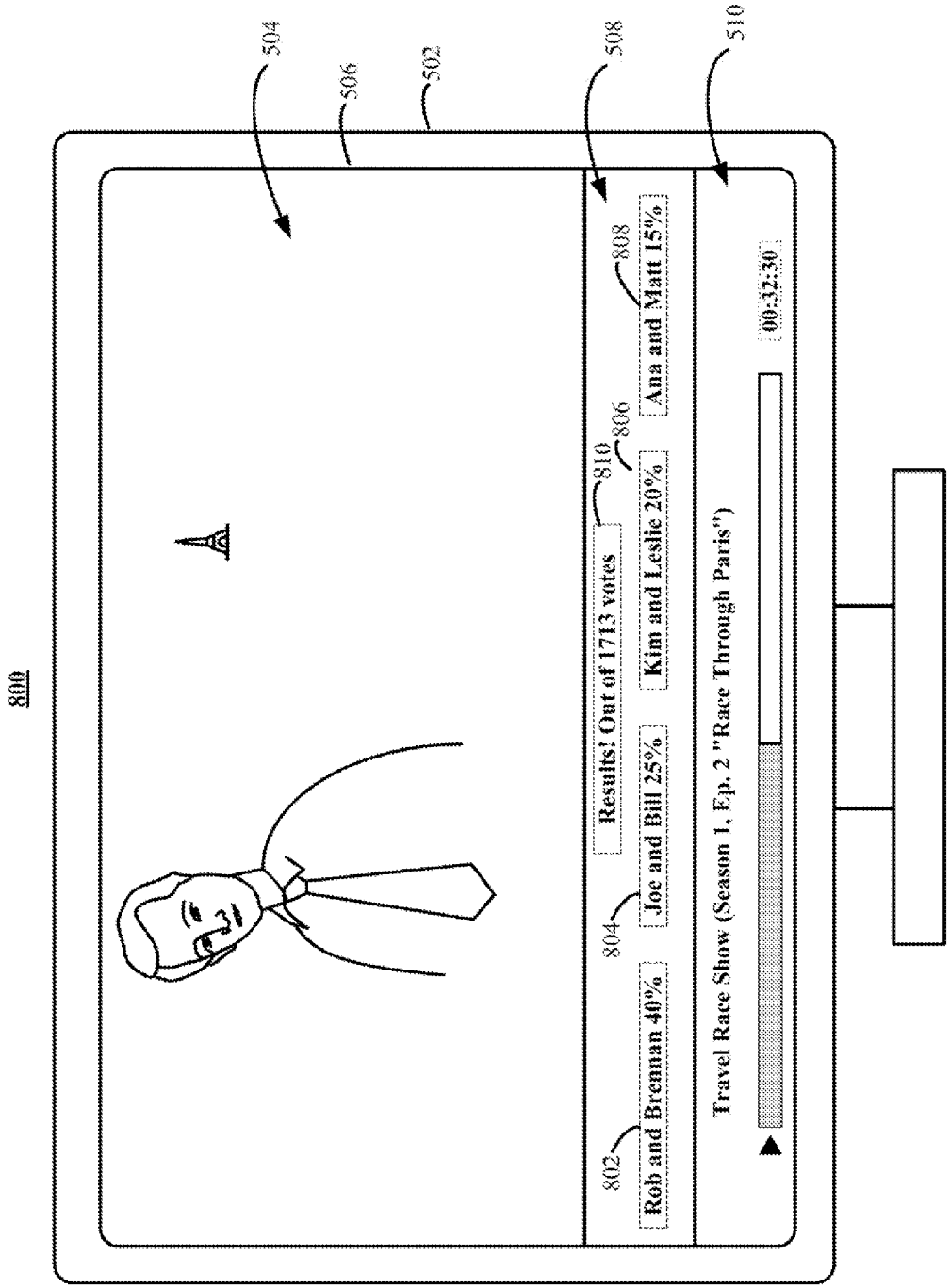
FIG. 8 shows an example of a user interface for presenting the results to the interactive poll shown in FIG. 7 in accordance with some implementations of the disclosed subject matter.

FIG. 8 shows an illustrative example 800 of a television device displaying a program and the results of a poll question as supplemental content in which the content generation application has indicated the results of the poll question of FIG. 7. As shown in example 800, the results can be indicated by presenting results 802-808 of the question 702, which are given in 800 as percentages but can be presented in any suitable format, such as a bar graph, a number, a pie chart, etc. A message 810 showing a number of participants (e.g., votes) in the poll and an indication that the supplemental content being displayed is a result is also shown in FIG. 8. In some implementations, a winner of the poll (e.g., an answer that received the most votes) can also be displayed using any suitable techniques, such as displaying text, an icon, an animation, a highlight region, etc.

Figure 9:
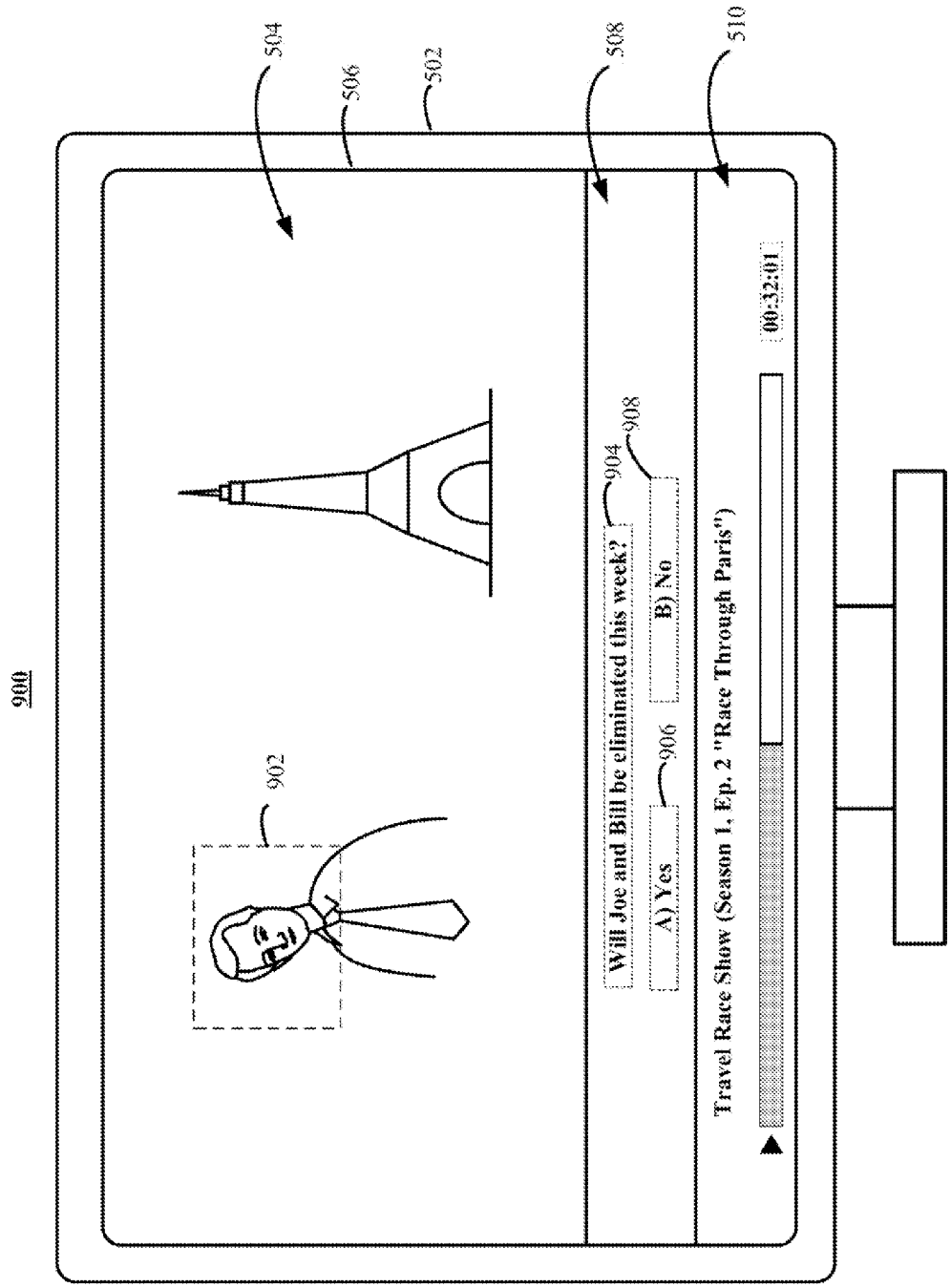
FIG. 9 shows an example of a user interface for showing results of an interactive poll in accordance with some implementations of the disclosed subject matter.

FIG. 9 shows an illustrative example 900 of a television device displaying a program and a time-sensitive poll question in accordance with some implementations of the disclosed subject matter. As shown in FIG. 9, the content generation application can determine that an image 902 of Joe (e.g., a contestant on the program "Travel Race Show"), a person that corresponds to a keyword associated with the program, is contained in video data of the program 504 at time 00:32:01. As described above in connection with FIG. 1, any suitable techniques can be used to determine that image 902 is an image of Joe. For example, facial recognition techniques or other image recognition techniques can be used to determine that image 902 is an image of Joe.

As shown in example 900, a time-sensitive poll can be presented on television 502 at a time when the content generation application determines that an image of Joe is present in video data of program 504. The content generation application can then generate a poll question asking whether Joe and Bill (e.g., Joe's teammate on the program) will be eliminated from the program this week (e.g., in a case where "Travel Race Show" is an episodic program that airs weekly). As described above in connection with FIG. 4, such a time-sensitive poll question can be presented at a time where Joe is detected as having been present in video data (or other data, such as text, audio, etc.) of the program, such that the poll question is relevant to the program.

In some implementations, results can be displayed after a user has answered the question in a similar manner as described in connection with FIG. 8.

Figure 10:
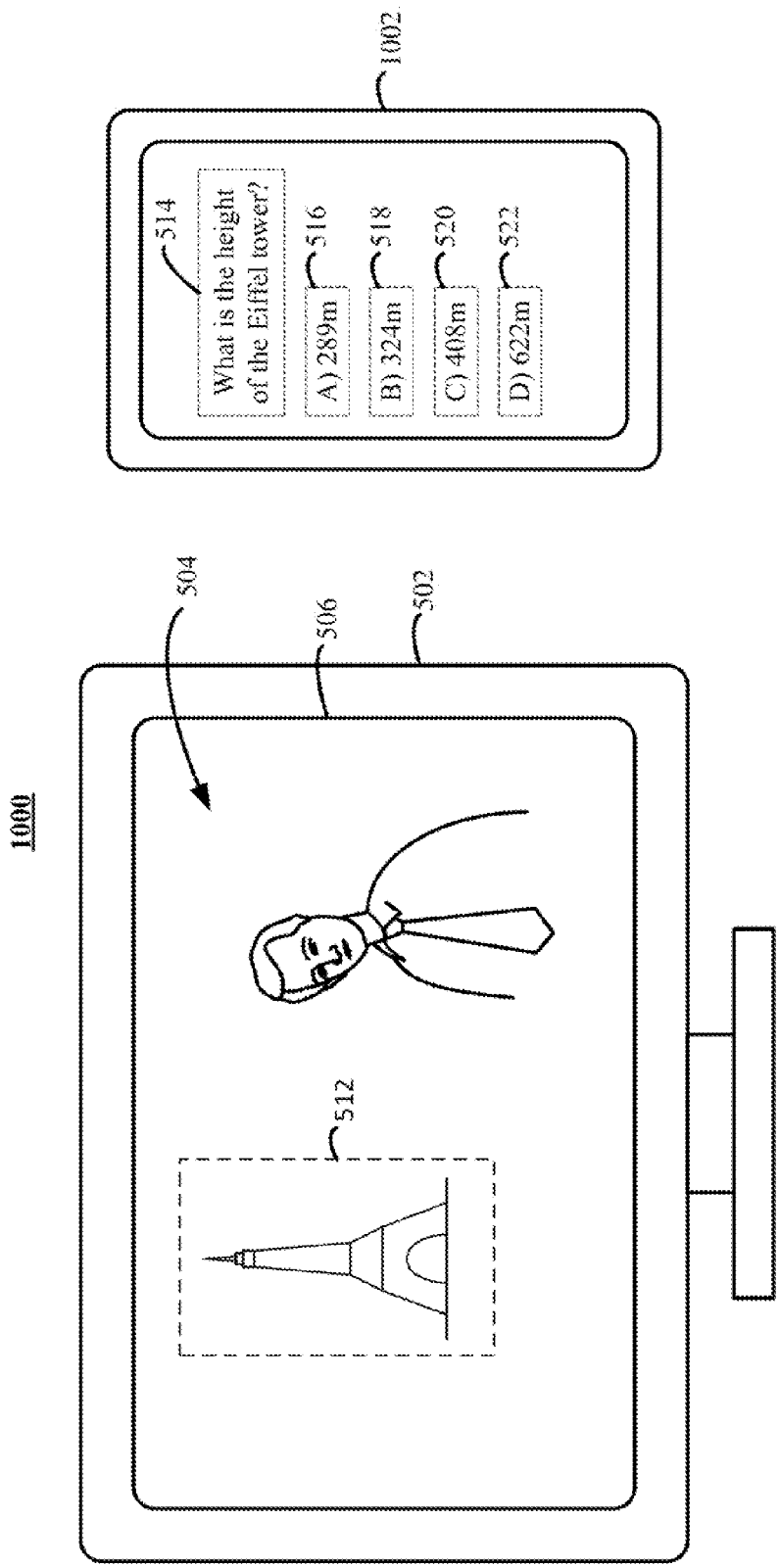
FIG. 10 shows an example of a user interface for presenting supplemental content on a second screen in accordance with some implementations of the disclosed subject matter.

FIG. 10 shows an illustrative example 1000 of a television device 502 displaying a program and second screen device 10002 displaying a quiz question in accordance with some implementations of the disclosed subject matter. As shown in FIG. 10 and described above in connection with FIG. 1, program 504 is being presented on television device 502 and supplemental content is being presented on a second screen device 1002. As described above, second screen device 1002 can be coupled to television device 502 (e.g., in communication with television device 502) or a device that is causing program 504 to be presented on television device 502, such as a set-top box or a digital media receiver. In some implementations, second screen device 1002 can be a stand-alone device that is not coupled to television device 502 or a device causing program 504 to be presented on television device 502 (e.g., second screen device is in communication with, for example, a server running the content generation application).

As shown in example 1000, a quiz question 514 can be presented on second screen device 1002 where a user can answer question 514 and/or receive other supplemental information such as a correct answer to question 514, poll questions, factual information, etc.

In some implementations, second screen device 1002 can be any computing device suitable for presenting supplemental content to a user such as a smartphone, a tablet computer, a wearable computer, a heads-up display, a laptop computer, a personal computer (PC), a smart television, etc.

Figure 11:
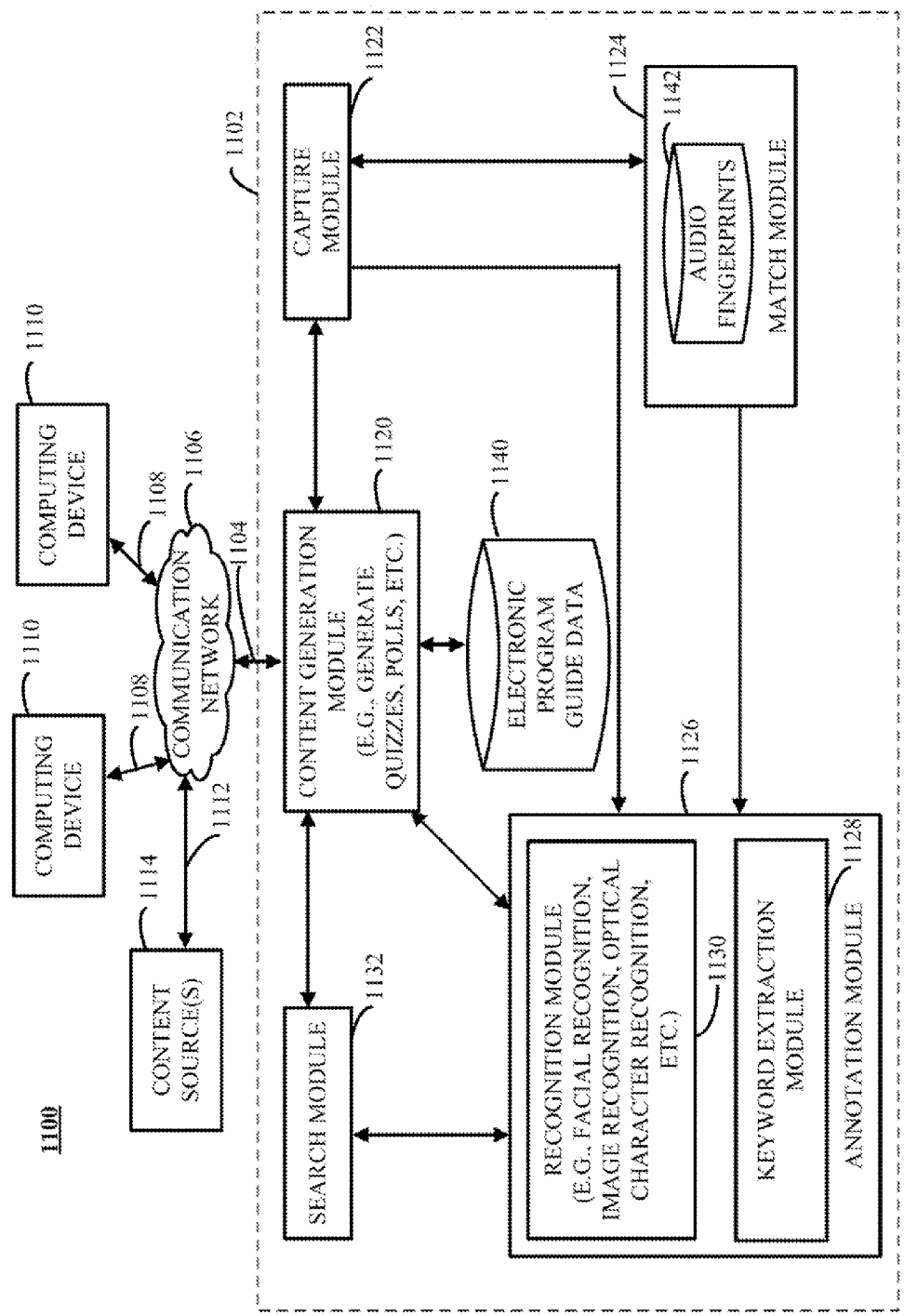
FIG. 11 shows a schematic diagram of an illustrative system suitable for implementation of the mechanisms described herein for generating and presenting supplemental content based on contextual information in accordance with some implementations of the disclosed subject matter.

Turning to FIG. 11, an illustrative example 1100 of a generalized schematic diagram of a system on which the mechanisms for generating and presenting supplemental content based on contextual information is shown in accordance with some implementations of the disclosed subject matter. As illustrated, system 1100 can include one or more computing devices 1110. Computing devices 1110 can be connected by one or more communication links 1108 to a communications network 1106 that can be linked via a communications link 1104 to a server 1102. In some implementations, computing devices 1110 and server 1102 can be linked via a communications link 1112 to one or more content sources 1114.

System 1100 can include one or more servers 1102. Server 1102 can be any suitable server for providing access to the content generation application, such as a processor, a computer, a data processing device, or any suitable combination of such devices. For example, content generation application can be distributed into multiple backend components and multiple frontend components and/or interfaces. In a more particular example, backend components, such as data collection and data distribution can be performed on one or more servers 1102.

In some implementations, frontend components of the content generation application (or a portion of the content generation application), such as a user interface and/or program identification features can be performed on one or more computing devices 1110.

In some implementations, each of the computing devices 1110 and server 1102 can be any of a general purpose device such as a computer or a special purpose device such as a client, a server, etc. Any of these general or special purpose devices can include any suitable components such as a hardware processor (which can be a microprocessor, digital signal processor, a controller, etc.), memory, communication interfaces, display controllers, input devices, etc. For example, computing device 1110 can be implemented as a smartphone, a tablet computer, a wearable computer, a smart television, a set-top box, a digital media receiver, a game console, a personal computer, a laptop computer, a personal data assistant (PDA), a home entertainment system, any other suitable computing device, or any suitable combination thereof.

For example, in some implementations, a program can be presented using a first computing device 1110, such as a smart television, a set-top box, a digital media receiver, etc., and supplemental content can be presented using a second computing device 1110, such as a tablet computer, a smartphone, a wearable computer, a PDA, etc.

In some implementations, content source(s) 1114 can be any suitable content sources, such as a cable (or telephone) television content source, a satellite television content source, an on-demand program content source, an over-the-top program content source, an Internet content source, a streaming program content source, any other suitable content source, or any suitable combination thereof.

In some implementations, communications network 1106 can be any suitable computer network or combination of such networks including the Internet, an intranet, a wide-area network (WAN), a local-area network (LAN), a wireless network, a digital subscriber line (DSL) network, a frame relay network, an asynchronous transfer mode (ATM) network, a virtual private network (VPN), etc. Communications links 1104, 1108 and 1112 can be any communications links suitable for communicating data among computing devices 1110, server 1102 and/or content source(s) 1114, such as network links, dial-up links, wireless links, hard-wired links, any other suitable communications links, or any suitable combination of such links. Computing devices 1110 can enable use of the techniques described herein that can allow the features of the mechanisms to be used. Computing devices 1110, server 1102 and content source(s) 1114 can be located at any suitable location.

In some implementations, server 1102 can include one or more modules 1120-1132 and/or databases 1140-1142 that can be interconnected, for performing various functions of the content generation application and/or facilitating the mechanisms for generating and presenting supplemental content based on contextual information.

In some implementations, a content generation module 1120 can perform processes for generating interactive content as described above in connection with, for example, FIGS. 1-4.

In some implementations, a capture module 1122 can receive media data related to a program, such as video data, audio data, electronic program guide data, metadata, etc., as described above in connection with, for example, FIG. 1. Additionally or alternatively, capture module 1122 can extract various media data from content provided from content sources as described in connection with, for example, FIG. 1. Such extracted media data can include, for example, audio fingerprints, subtitles, video screenshots, etc. This information can be stored, for example, in a database (not shown) for use by the content generation application in identifying keywords and/or various other operations.

In some implementations, a match module 1124 can receive audio fingerprint data for a program from capture module 1122 and store the received audio fingerprint data in a fingerprint database 1142. This fingerprint database can be used, for example, to identify a program at 116 of FIG. 1 described above, to determine a program that is being presented to a user and for which the user has requested supplemental content.

In some implementations, an annotation module 1126 can extract one or more keywords based on data captured by capture module 1122 and/or information extracted by capture module 1122, such as audio fingerprints, video screenshots, subtitles, etc. For example, annotation module 1126 can include a keyword extraction module 1128 that can extract keywords from the data and/or information received from the capture module using a recognition module 1130 configured to perform recognition techniques, such as facial recognition techniques, image recognition techniques, optical character recognition techniques, etc.

In some implementations, keyword extraction module 1128 can extract keywords, such as the keywords described above in connection with FIG. 1. For example, keyword extraction module 1128 can extract the identity of people, places, events, objects, creatures, logos, or any other suitable keywords. Additionally or alternatively, keyword extraction module 1128 can identify keywords using recognition module 1130, which can, for example, compare information from an image(s) of a face(s) from video screenshots to a database of known face information (e.g., face information of known individuals) to determine an identity of a person in the image(s). Similarly, recognition module 1130 can, for example, compare information from an image(s) of an object(s), such as buildings, statutes, product packaging, electronics, fruit and vegetables, or any other suitable object to a database of known object information to determine an identity of an object in an image. As described above, any suitable recognition techniques can be used by recognition module 1130 to facilitate keyword extraction from program related data by keyword extraction module 1128 and/or annotation module 1126.

In some implementations, annotation module 1126 can associate keywords extracted from, for example, audio data or video data with a time in a program when the keyword appears in such data.

In some implementations, a search module 1132 can be used in determining a popularity score for keywords and/or for identifying properties associated with such keywords. For example, search module 1132 can determine a popularity score at 108 of FIG. 1 and/or obtaining properties associated with a keyword at 110 of FIG. 1.

In some implementations, an electronic program guide (EPG) database 1140 can store guidance data corresponding to electronic program guide data which can be provided by third parties, such as content publishers or broadcasters. Additionally, EPG database 1140 can provide information about one or more programs provided from, for example, content source(s) 1114.

It should be noted that, although modules 1120-1132 and databases 1140-1142 are shown as being included in server 1102, these modules and/or databases can be provided in different servers in various combinations. For example, search module 1132 can be provided on a first server and modules 1120-1130 can be provided on a second server. As another example, each module can be provided on a different server. It should be noted that these are merely examples, and the modules described can be organized in any suitable manner.

It should also be noted that modules 1120-1132 can be included as part of the content generation application, can each be a separate application, or can be part of any other suitable application.

Figure 12:
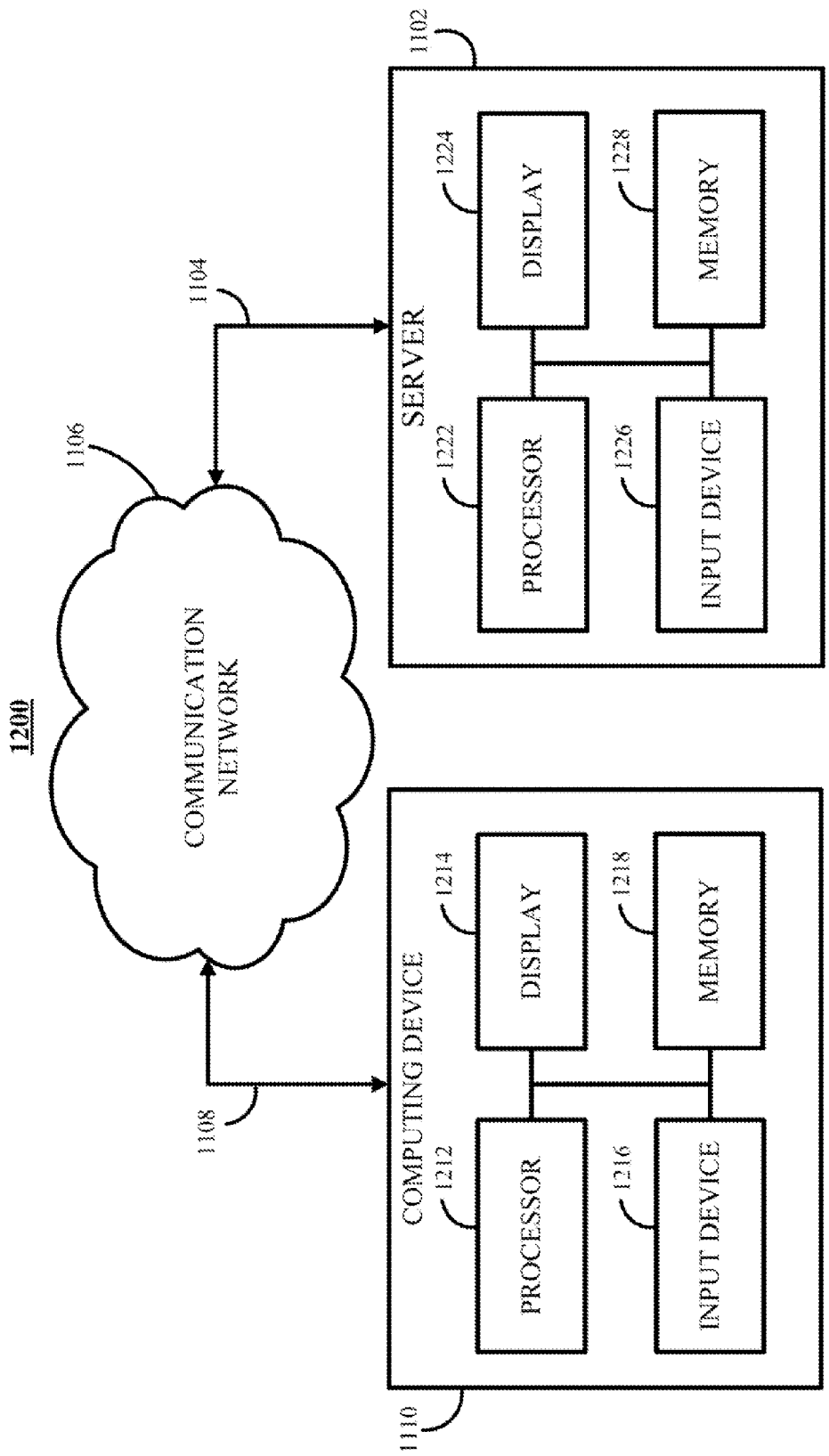
FIG. 12 shows a detailed example of a server and one of the computing devices of FIG. 11 that can be used in accordance with some implementations of the disclosed subject matter.

FIG. 12 illustrates an example 1200 of hardware that can be used to implement server 1102 and one of computing devices 1110 depicted in FIG. 11 in accordance with some implementations. Referring to FIG. 12, computing device 1110 can include a hardware processor 1212, a display 1214, an input device 1216, and memory 1218, which can be interconnected. In some implementations, memory 1218 can include a storage device (such as a non-transitive computer-readable medium) for storing a computer program for controlling hardware processor 1212.

Hardware processor 1212 can use the computer program to present on display 1214 content and/or an interface that allows a user to interact with the content generation application and to send and receive data through communications link 1108. It should also be noted that data received through communications link 1108 or any other communications links can be received from any suitable source. In some implementations, hardware processor 1212 can send and receive data through communications link 1108 or any other communication links using, for example, a transmitter, receiver, transmitter/receiver, transceiver, or any other suitable communication device. Input device 1216 can be a computer keyboard, a mouse, a trackball, a keypad, a remote control, any other suitable input device, or any suitable combination thereof. Additionally or alternatively, input device 1216 can include a touch screen display 1214 that can receive input (e.g. using a finger, a stylus, or the like).

Server 1102 can include a hardware processor 1222, a display 1224, an input device 1226, and memory 1228, which can be interconnected. In some implementations, memory 1228 can include a storage device for storing data received through communications link 1104 or through other links, and processor 1222 can receive commands and values transmitted by one or more users of, for example, computing device 1110. The storage device can further include a server program for controlling hardware processor 1222.

The mechanisms described herein for generating and presenting supplemental content can be implemented in computing devices 1110 and/or server 1102 as software, firmware, hardware, or any suitable combination thereof.

In some implementations, server 1102 can be implemented as one server or can be distributed as any suitable number of servers. For example, multiple servers 1102 can be implemented in various locations to increase reliability, function of the application, and/or the speed at which the server can communicate with computing devices 1110.

In some implementations, the user input interface application can include an application program interface (not shown), and/or can be resident in memory 1218 of computing device 1110 and/or memory 1228 of server 1102. Additionally or alternatively a graphical user interface ("GUI") can be distributed to computing device 1110, which can allow a user to interact with the content generation application resident at, for example, server 1102.

In some implementations, the content generation application can include client-side software, server-side software, hardware, firmware, or any suitable combination thereof. For example, the content generation application can encompass a computer program that causes one or more processors to execute the content generation application. As another example, the application(s) can encompass a computer program written in a programming language recognizable by computing device 1110 and/or server 1102 that is executing the application(s) (e.g., a program written in a programming language, such as, Java, C, Objective-C, C++, C#, Javascript, Visual Basic, HTML, XML, ColdFusion, any other suitable approaches, or any suitable combination thereof).

In some implementations, the content generation application can encompass one or more Web-pages or Web-page portions (e.g., via any suitable encoding, such as HyperText Markup Language ("HTML"), Dynamic HyperText Markup Language ("DHTML"), Extensible Markup Language ("XML"), JavaServer Pages ("JSP"), Active Server Pages ("ASP"), Cold Fusion, or any other suitable approaches).

Accordingly, methods, systems, and media for generating and presenting supplemental content based on contextual information are provided.

In some implementations, any suitable computer readable media can be used for storing instructions for performing the functions and/or processes described herein. For example, in some implementations, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

It should be understood that the above described steps of the processes of FIGS. 1-4 can be executed or performed in any order or sequence not limited to the order and sequence shown and described in the figures. Also, some of the above steps of the processes of FIGS. 1-4 can be executed or performed substantially simultaneously where appropriate or in parallel to reduce latency and processing times.

It should also be noted that, as used herein, the term mechanism can encompass hardware, software, firmware, or any suitable combination thereof.

Although the invention has been described and illustrated in the foregoing illustrative implementations, it is understood that the present disclosure has been made only by way of example, and that numerous changes in the details of implementation of the invention can be made without departing from the spirit and scope of the invention, which is limited only by the claims that follow. Features of the disclosed implementations can be combined and rearranged in various ways.

What is claimed is:

1. A method for presenting content to a user, the method comprising:
   identifying, using a hardware processor, a program based on first media data;
   identifying, using the hardware processor, a plurality of keywords corresponding to entities from the program;
   determining, using the hardware processor, a popularity score associated with each of the plurality of keywords;
   obtaining, using the hardware processor, one or more properties associated with each of a subset of keywords of the plurality of keywords based on the popularity score associated with each keyword;
   generating, using the hardware processor and without user intervention, a plurality of items of supplemental content each related to at least one entity from the program based on the one or more properties of the keyword corresponding to the at least one entity;
   causing, using the hardware processor, the plurality of items of supplemental content to be stored;
   receiving, using the hardware processor, a request for supplemental content and second media data from a computing device; and
   upon determining that the second media data corresponds to the program, causing, using the hardware processor, at least one item of supplemental content of the stored plurality of items of supplemental content to be presented by the computing device.

2. The method of claim 1, further comprising:
   receiving an audio fingerprint representing audio data that corresponds to the program;
   comparing the received audio fingerprint with a plurality of audio fingerprints corresponding to media content; and
   identifying the program based on the comparison.

3. The method of claim 1, further comprising:
   receiving a channel corresponding to the program;
   retrieving at least one of subtitle data, video data, and metadata associated with the program based on the received channel; and
   using an image recognition technique on the subtitle data, the video data, or the metadata to identify the plurality of keywords, wherein the image recognition technique is selected from at least one of: optical character recognition, image recognition, and facial recognition.

4. The method of claim 1, wherein the popularity score is determined by:
   obtaining popularity information associated with each of the plurality of keywords, wherein the popularity information includes at least one of: search popularity information relating to the keyword, social network popularity information relating to the keyword, and a number of web pages containing the keyword;
   assigning a weight to each piece of obtained popularity information; and
   generating the popularity score based on the assigned weight.

5. The method of claim 1, further comprising:
   ranking the plurality of keywords based on the popularity scores;
   selecting the subset of keywords based on the ranking.

6. The method of claim 1, wherein the plurality of items of supplemental content includes at least one of a quiz question and a poll question.

7. The method of claim 1, further comprising causing the at least one item of supplemental content to be presented on a mobile device associated with the computing device in response to receiving the request for supplemental content from the computing device.

8. A system for presenting content to a user, the system comprising:
   a hardware processor that is configured to:
      identify a program based on first media data;
      identify a plurality of keywords corresponding to entities from associated with the program;
      determine a popularity score associated with each of the plurality of keywords;

obtain one or more properties associated with each of a subset of keywords of the plurality of keywords based on the popularity score associated with each keyword;

generate, without user intervention, a plurality of items of supplemental content each related to at least one entity from the program based on the one or more properties of the keyword corresponding to the at least one entity;

cause the plurality of items of supplemental content to be stored;

receive a request for supplemental content and second media data from a computing device; and upon determining that the second media data corresponds to the program, causing at least one item of supplemental content of the stored plurality of items of supplemental content to be presented by the computing device.

9. The system of claim 8, wherein the hardware processor is further configured to:

receive an audio fingerprint representing audio data that corresponds to the program;

compare the received audio fingerprint with a plurality of audio fingerprints corresponding to media content; and identify the program based on the comparison.

10. The system of claim 8, wherein the hardware processor is further configured to:

receive a channel corresponding to the program;

retrieve at least one of subtitle data, video data, and metadata associated with the program based on the received channel; and use an image recognition technique on the subtitle data, the video data, or the metadata to identify the plurality of keywords, wherein the image recognition technique is selected from at least one of: optical character recognition, image recognition, and facial recognition.

11. The system of claim 8, wherein the hardware processor is further configured to:

obtain popularity information associated with each of the plurality of keywords, wherein the popularity information includes at least one of: search popularity information relating to the keyword, social network popularity information relating to the keyword, and a number of web pages containing the keyword;

assign a weight to each piece of obtained popularity information; and generate the popularity score based on the assigned weight.

12. The system of claim 8, wherein the hardware processor is further configured to:

rank the plurality of keywords based on the popularity score;

select the subset of keywords based on the ranking.

13. The system of claim 8, wherein the plurality of items of supplemental content includes at least one of a quiz question and a poll question.

14. The system of claim 8, wherein the hardware processor is further configured to cause the at least one item of supplemental content to be presented on a mobile device associated with the computing device in response to receiving the request for supplemental content from the computing device.

15. A non-transitory computer-readable medium containing computer executable instructions that, when executed by a processor, cause the processor to perform a method for presenting content to a user, the method comprising:

identifying a program based on first media data;

identifying a plurality of keywords corresponding to entities from the program;

determining a popularity score associated with each of the plurality of keywords;

obtaining one or more properties associated with each of a subset of keywords of the plurality of keywords based on the popularity score associated with each keyword;

generating, without user intervention, a plurality of items of supplemental content each related to at least one entity from the program based on the one or more properties of the keyword corresponding to the at least one entity;

causing the plurality of items of supplemental content to be stored;

receiving a request for supplemental content and second media data from a computing device; and upon determining that the second media data corresponds to the program, causing at least one item of supplemental content of the stored plurality of items of supplemental content to be presented by the computing device.

16. The non-transitory computer-readable medium of claim 15, wherein the method further comprises:

receiving an audio fingerprint representing audio data that corresponds to the program;

comparing the received audio fingerprint with a plurality of audio fingerprints corresponding to media content; and identifying the program based on the comparison.

17. The non-transitory computer-readable medium of claim 15, wherein the method further comprises:

receiving a channel corresponding to the program;

retrieving at least one of subtitle data, video data, and metadata associated with the program based on the received channel; and using an image recognition technique on the subtitle data, the video data, or the metadata to identify the plurality of keywords, wherein the image recognition technique is selected from at least one of: optical character recognition, image recognition, and facial recognition.

18. The non-transitory computer-readable medium of claim 15, wherein the method further comprises:

obtaining popularity information associated with each of the plurality of keywords, wherein the popularity information includes at least one of: search popularity information relating to the keyword, social network popularity information relating to the keyword, and a number of web pages containing the keyword;

assigning a weight to each piece of obtained popularity information; and generating the popularity score based on the assigned weight.

19. The non-transitory computer-readable medium of claim 15, wherein the method further comprises:

ranking the plurality of keywords based on the popularity scores;

selecting the subset of keywords based on the ranking.

20. The non-transitory computer-readable medium of claim 15, wherein the plurality of items of supplemental content includes at least one of a quiz question and a poll question.

21. The non-transitory computer-readable medium of claim 15, wherein the method further comprises causing the at least one item of supplemental content to be presented on a mobile device associated with the computing device in response to receiving the request for supplemental content from the computing device.

* * * * *